(12) United States Patent
Sako

(10) Patent No.: US 7,397,748 B2
(45) Date of Patent: *Jul. 8, 2008

(54) OPTICAL RECORDING MEDIUM, RECORDING METHOD AND APPARATUS FOR OPTICAL RECORDING MEDIUM AND REPRODUCING METHOD AND APPARATUS

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 381 days.

This patent is subject to a terminal disclaimer.

(21) Appl. No.: 10/926,743

(22) Filed: Aug. 26, 2004

(65) Prior Publication Data

US 2005/0036412 A1     Feb. 17, 2005

Related U.S. Application Data

(62) Division of application No. 09/601,786, filed as application No. PCT/JP99/06859 on Dec. 7, 1998, now Pat. No. 6,810,004.

(30) Foreign Application Priority Data

Dec. 7, 1998   (JP)   ............... P10-346439
Dec. 25, 1998  (JP)   ............... P10-370682
Aug. 18, 1999  (JP)   ............... P11-231389

(51) Int. Cl.
G11B 7/00 (2006.01)

(52) U.S. Cl. ............ 369/53.31; 369/44.26; 369/44.29; 369/47.19; 369/47.24; 369/47.27; 369/53.37

(58) Field of Classification Search ............ None
See application file for complete search history.

(56) References Cited

U.S. PATENT DOCUMENTS

| | | | |
|---|---|---|---|
| 5,570,339 A | 10/1996 | Nagano | |
| 5,696,757 A | 12/1997 | Ozaki et al. | |
| 5,807,640 A | 9/1998 | Ueno et al. | |
| 5,809,004 A | 9/1998 | Kobayashi et al. | |
| 6,031,815 A | 2/2000 | Heemskerk et al. | |
| 6,083,667 A | 7/2000 | Nishizawa et al. | |
| 6,331,969 B1 | 12/2001 | Kobayashi et al. | |
| 6,801,490 B1 * | 10/2004 | Sako et al. | 369/53.31 |

FOREIGN PATENT DOCUMENTS

| | | |
|---|---|---|
| EP | 0 545 472 | 6/1993 |
| EP | 0 635 828 | 1/1995 |
| EP | 0 703 576 | 3/1996 |
| EP | 0 723 216 | 7/1996 |
| EP | 0 936 610 | 8/1999 |

(Continued)

Primary Examiner—Wayne Young
Assistant Examiner—Adam R. Giesy
(74) Attorney, Agent, or Firm—Lerner, David, Littenberg, Krumholz & Mentlik, LLP

(57) ABSTRACT

An optical recording medium having a track including plural pits formed based on first data and lands defined between neighboring pits, these pits are deformed as they are recorded based on second data. The first and second data are synthesized and reproduced to realize audio reproduction with a broad frequency range. The first data are adapted to be reproducible by a customary disc reproduction device. The reproduction of the first data is controlled by the second data to protect recorded data.

26 Claims, 13 Drawing Sheets

FOREIGN PATENT DOCUMENTS

| | | |
|---|---|---|
| EP | 0 980 069 | 2/2000 |
| JP | 04-074317 | 3/1992 |
| JP | 5205274 | 8/1993 |
| JP | 7169102 | 7/1995 |
| JP | 8069626 | 3/1996 |
| JP | 8077599 | 3/1996 |
| JP | 8315368 | 11/1996 |
| WO | WO-97/50081 | 12/1997 |

* cited by examiner

FIG.5A

CONNECTING BITS (3 CHANNEL BITS)
14 CHANNEL BITS (1 BYTE) "71H"
CONNECTING BITS (3 CHANNEL BITS)
14 CHANNEL BITS (1 BYTE) "68H"

$P_1$ LOGIC 1 $P_{L1}$ 1.75 [μm]
W 0.5 [μm]
$P_1$ LOGIC 0 $P_{L2}$ 1.73 [μm]
W 0.5 [μm]
$P_1$ LOGIC 1 $R_1$
$P_1$ LOGIC 0

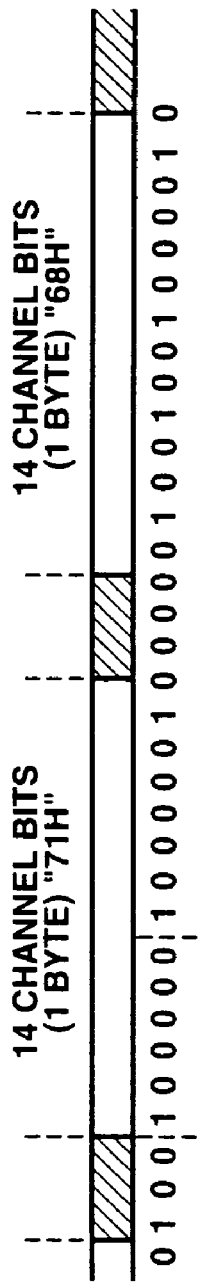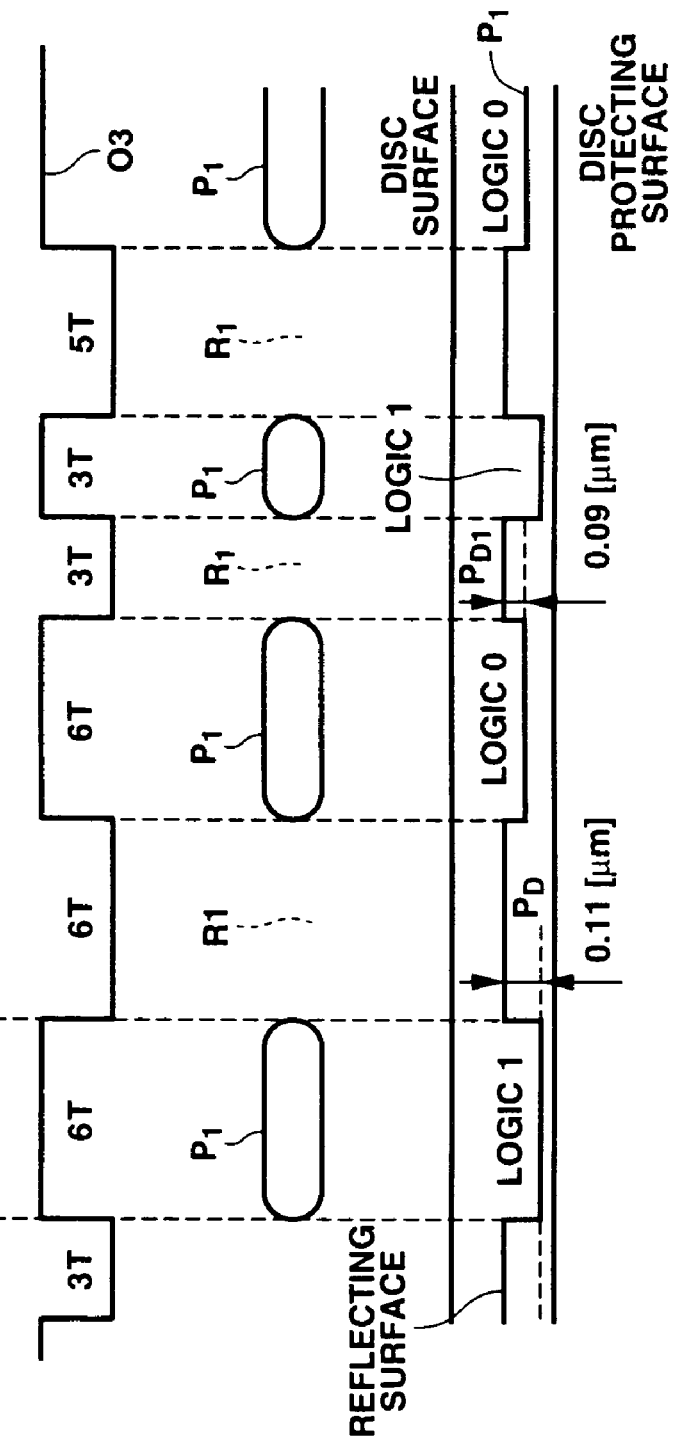

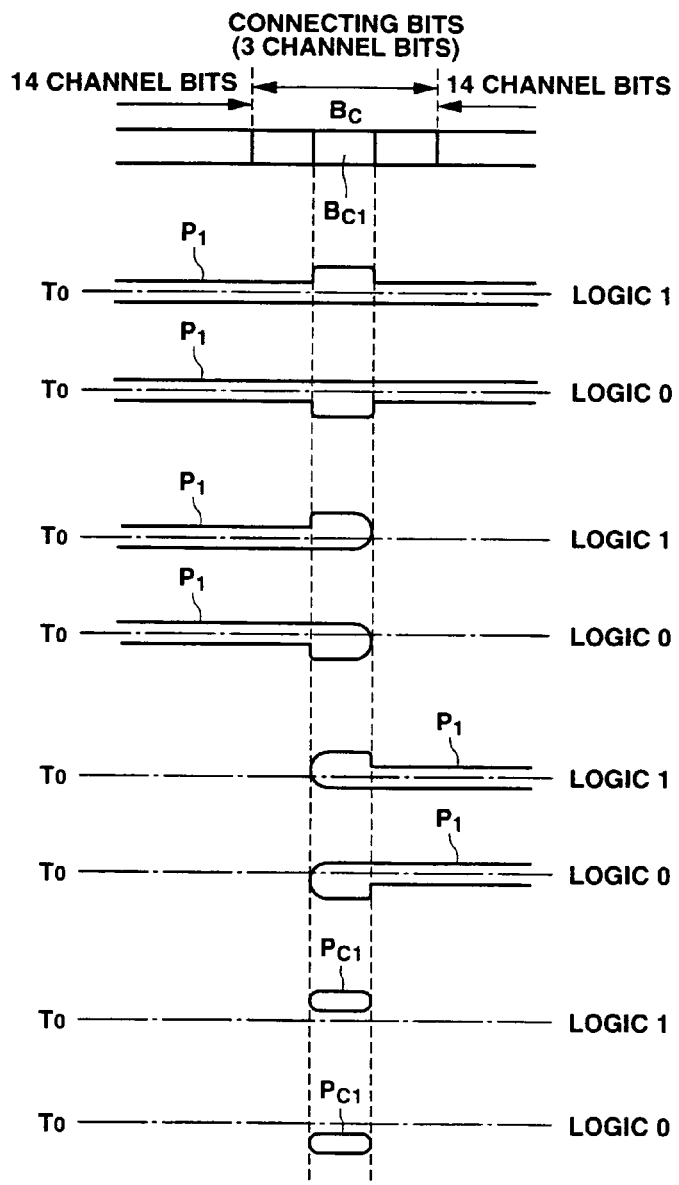

OPTICAL RECORDING MEDIUM, RECORDING METHOD AND APPARATUS FOR OPTICAL RECORDING MEDIUM AND REPRODUCING METHOD AND APPARATUS

CROSS-REFERENCE TO RELATED APPLICATIONS

This application is a divisional of U.S. application Ser. No. 09/601,786, filed on Aug. 7, 2000, now U.S. Pat. No. 6,810,004, which is a national stage application of International Application No. PCT/JP99/06859, filed Dec. 7, 1999, which claims priority from Japanese Application Nos. P10-346439, filed on Dec. 7, 1998, P10-370682, filed Dec. 25, 1998, and P11-231389, filed Aug. 18, 1999, the disclosures of which are hereby incorporated by reference herein.

BACKGROUND OF THE INVENTION

Technical Field

This invention relates to an optical recording medium having recorded thereon second data, as supplementary data, in addition to first data as main data, a recording method and apparatus for recording the supplementary data along with the main data on this optical recording medium and a method and apparatus for reproducing an optical recording medium having the first and second data recorded thereon.

More particularly, this invention relates to an optical recording medium in which the shape of plural pits of a track comprised of the pits representing recording data and lands between these pits is deformed to record other data, a recording method and apparatus for recording data on the optical recording medium and to a method and apparatus for reproducing the optical recording medium.

Background Art

Up to now, an optical disc, such as a compact disc with a diameter equal to 12 cm, is widely employed as an optical recording medium having recorded thereon audio data, such as music numbers.

In recording on this optical disc, audio data is sequentially blocked and added to with an error correction code. The resulting data is modulated with EFM (eight to fourteen modulation), with the results of the modulation being recorded by NRZI (non-return-to-zero inverted) modulation. On the compact disc, audio data is recorded by repetition of pits and lands with nine different lengths of the periods of 3T to 11T, where T is the basic period equal to the channel clock period.

The pits formed in the optical disc based on the recorded audio data are of length in the track direction equal to approximately 0.87 to 3.18 μm, in association with the periods of 3T to 11T, with the pit width corresponding to the length in a direction perpendicular to the track direction being approximately 0.5 μm, with its depth being approximately 0.1 μm.

Meanwhile, in a compact disc, audio data is recorded in a frequency range of 20 Hz to 20 kHz. However, a demand is raised to enable audio data to be recorded over a broader frequency range to realize audio reproduction of a higher sound quality. There is also raised a demand for recording audio data of three or more channels, instead of two channels, that is left and right channels, to enable variegated audio reproduction, such as surround reproduction.

Moreover, there is raised a demand for enabling audio data recorded on an optical disc to be reproduced only under a pre-set condition to protect the recorded audio data.

SUMMARY OF THE INVENTION

The present invention provides an optical recording medium including a track constituted by a plurality of pits formed based on first data recorded therein and lands defined between the pits, wherein the plural pits are deformed based on second data.

The present invention also provides a recording apparatus for an optical recording medium including an objective lens for converging a recording laser beam outputted by a modulator for modulating the recording laser beam radiated by a light source for radiating the recording laser beam based on the furnished first data and second data to the optical recording medium. This recording apparatus includes a signal processor for generating first data based on main data recorded on the optical recording medium and for generating second data based on supplementary data of the main data recorded on the optical recording medium.

The present invention also provides a reproducing apparatus for an optical recording medium, the apparatus including an optical pickup for reading out first and second data from an optical recording medium including a track formed by a plurality of pits formed based on the first data recorded therein and a land defined between neighboring pits, with the pits being deformed based on the second data, a first demodulator for demodulating the first data of the optical recording medium based on an output signal of the optical pickup, and a second demodulator for demodulating the second data of the optical recording medium based on the output signal of the optical pickup. The second demodulator includes a demodulation processor for demodulating an output of the signal level discriminating portion adapted for discriminating the signal level of the playback signal supplied from the signal processor.

Preferably, the reproducing apparatus also includes a synthesizing portion for synthesizing an output signal of the first demodulator and an output signal of the second demodulator. The reproducing apparatus also includes an external equipment discriminating portion for discriminating whether or not an external equipment connected to the apparatus is an authentic external equipment. The reproducing apparatus outputs at least an output signal of the second modulator when the an external equipment connected to the apparatus is discriminated by the external equipment discriminating portion to be an authentic external equipment.

The optical pickup preferably includes a photodetector split in the track direction of the optical recording medium at least into a first photodetector portion and a second photodetector portion. The apparatus also includes a signal processor for processing output signals of the first and second photodetector portions. The first demodulator is fed from the signal processor with a sum signal representing the sum of output signals of the first and second photodetector portions, whilst the second demodulator is fed from the signal processor with a difference signal representing the difference between output signals of the first and second photodetector portions.

The present invention also provides a reproducing apparatus for an optical recording medium including an optical pickup for reading out first and second data and discriminating data from an optical recording medium including a track formed by a plurality of pits formed based on the first data recorded therein and a land defined between neighboring pits, with the pits being deformed based on the second data. The optical recording medium also has the discriminating data recorded thereon. The reproducing apparatus for an optical recording medium also includes a first demodulator for demodulating the first data of the optical recording medium based on an output signal of the optical pickup, a second demodulator for demodulating the second data of the optical recording medium based on the output signal of the optical pickup and a controller for controlling the operation of the second demodulator based on the discriminating data read out by the optical pickup from the optical recording medium.

The present invention also provides an optical recording medium including a data recording area having a spirally extending track constituted by a plurality of pits formed based on first data recorded therein and lands defined between neighboring pits, and a management data area for recording therein management data for the first data recorded in the data recording area. At least the plural bits recorded in the management area are previously deformed based on the second data.

Preferably, the first data is digital data recorded on the optical recording medium, whilst the second data is supplementary data to the digital data. The supplementary data is data at least including copyright data.

Preferably, the first data is upper bits of digital data recorded on the optical recording medium, whilst the second data is lower bits of the digital data.

In the management data area, there is preferably recorded discriminating data indicating whether or not the second data is recorded on the optical recording medium. Preferably, the first data recorded on the optical recording medium is encrypted, whilst the second data is recorded as key data for decrypting the first data.

The present invention also provides a method for recording an optical recording medium including modulating a recording laser beam outputted by a light source with furnished first and second data, converging the modulated recording laser beam on an optical recording medium through an objective lens for forming a track including at least a plurality of pits derived from the first data and lands defined between the pits and deforming the pits formed on the optical recording medium based on the second data. The first data is generated based on the main data recorded on the optical recording medium, whilst the second data is generated based on the supplementary data to the main data recorded on the optical recording medium.

The present invention also provides a method for reproducing an optical recording medium including reading out first and second data from an optical recording medium including a track formed by a plurality of pits formed based on the first data recorded therein and a land defined between neighboring pits, the pits being deformed based on the second data, demodulating the first data of the optical recording medium based on an output signal of data read out from the optical recording medium and demodulating the second data based on playback signals of data read out from the optical recording medium.

Preferably, the signal level of the playback signals read out from the optical recording medium is discriminated to demodulate the second data.

Preferably, the demodulated first and second data are synthesized together and outputted.

In this reproducing method, at least demodulated second data preferably is outputted and reproduced when an external equipment connected to a reproducing apparatus is discriminated to be an authentic external equipment.

The present invention also provides a reproducing method for an optical recording medium including demodulating first data based on playback signals of data read out from an optical recording medium including a track made up of a plurality of pits formed based on the first data recorded and lands defined between neighboring pits, with the plural bits being deformed based on second data, with the optical recording medium having discriminating data recorded thereon, and demodulating the second data based on playback signals of data read out from the optical recording medium based on the results of discrimination of the discrimination data read out from the optical recording medium. If the discriminating data recorded on the optical recording medium indicates that the second data has been recorded on the optical recording medium, the second data is demodulated based on the data read out from the optical recording medium.

Other objects and advantages of the present invention will become apparent from the following description which is made with reference to the accompanying drawings.

BRIEF DESCRIPTION OF THE DRAWINGS

FIGS. 5A to 5D show the structure of a track containing pits formed in an optical disc reproduced by the disc reproducing apparatus shown in FIG. 3.

FIGS. 6A to 6D show the structure of a track containing pits formed in an optical disc according to a second embodiment of the present invention.

FIGS. 12A to 12E are plan views showing the structure of pits formed in an optical disc according to a ninth embodiment of the present invention.

BEST MODE FOR CARRYING OUT THE INVENTION

DETAILED DESCRIPTION

Figure 1:
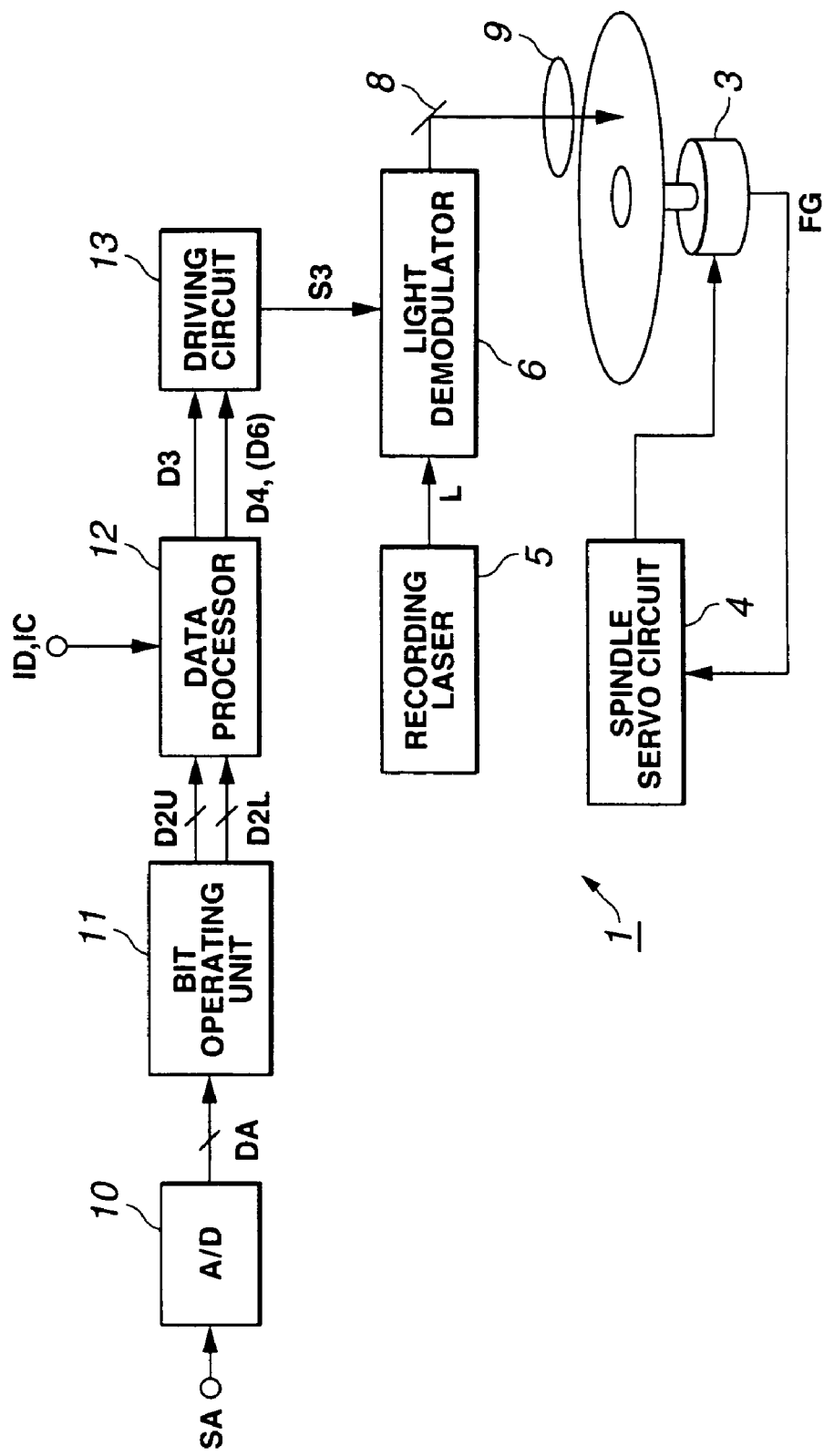
FIG. 1 is a block diagram showing a recording apparatus for an optical disc according to the present invention.

Referring to the drawings, an optical recording medium, a recording method and apparatus for recording the optical recording medium and a method and apparatus for reproducing an optical recording medium are hereinafter explained in detail.

(1) Recording Apparatus

A recording device for recording data on an optical recording medium according to the present invention is first explained.

This recording device is used for fabricating an optical disc as an optical recording medium according to the present invention. For fabricating the optical disc according to the present invention, a master disc 2, exposed to light by the recording device 1 shown in FIG. 1, is developed and processed with electroforming to produce a mother disc, which then is used for producing the optical disc. In forming the optical disc, a stamper is formed from a mother disc and a metal mold device carrying this stamper is used to mold a disc substrate. A reflective film then is deposited on the molded disc substrate to deposit a reflective film.

A master disc 2, exposed to light using the recording device shown in FIG. 1, is prepared by coating a light sensitizer on a flat glass substrate. The master disc 2 is loaded on a spindle motor 3 and run in rotation at a constant rpm by the spindle motor 3 being driven rotationally under control by a spindle servo circuit 4. At this time, the spindle motor 3 generates an FG signal FG the signal level of which rises at an interval of a pre-set rotational angle by an FG signal generator provided on its bottom. The spindle servo circuit 4 drives the spindle motor 3 so that the FG signal FG will be of a pre-set frequency, thereby causing the master disc 2 to run in rotation at a constant linear velocity.

A recording laser 5 is constructed by e.g., a gas laser, and radiates a laser beam of a pre-set light volume. A light modulator 6 is constituted by an electro-acoustic optical element and is adapted for intensity modulating the laser beam L incident from the recording laser 5 in keeping with a driving signal S3 to raise this laser beam L intermittently responsive to the rise of the signal level of the driving signal S3. The light modulator 6 changes the light volume of the laser beam L, raised in this manner, responsive to the signal level of the driving signal.

A mirror 8 warps the light path of the laser beam L to radiate the light towards the master disc 2. An objective lens 9 converges the reflected light of the mirror 8 onto the recording surface of the master disc 2. The mirror 8 and the objective lens 9 are sequentially fed in the radial direction of the master disc 2, by a sled mechanism, not shown, in synchronism with rotation of the master disc 2. As the mirror 8 and the objective lens 9 are fed, the optical disc recording device 1 sequentially displaces the light converging position of the laser beam L from the inner rim towards the outer rim of the master disc 2 to form a spirally or concentrically extending track on the master disc 2. At this time, a pit string made up of plural pits corresponding to modulating signals is formed on this track. This pit string is modulated in width by the modulating signal S3.

An analog/digital (A/D) conversion circuit 10 analog/digital converts an audio signal SA supplied from a pre-set music source to output 18-bit parallel audio data DA having the sampling frequency DA of 44.1 kHz.

A bit operating unit 11 splits the 18-bit parallel audio data DA into upper-order 16-bit first data D2U and lower-order 2-bit second data D2L. The first data D2U corresponds to audio data recorded on a customary compact disc. The second data D2L is the supplementary data to the first data D2U and may, for example, be audio data of the high frequency range not contained in the first data D2U.

A data processing circuit 12 is fed with TOC (table-of-contents) data, recorded on a lead-in area of an optical disc, and processes this TOC data in accordance with the format prescribed for a customary compact disc. This permits the data processing circuit 12 to generate and output channel data corresponding to the bit string.

To the TOC data, thus recorded, there are allocated disc discrimination data ID indicating that the optical disc has recorded thereon audio data D2L containing second data D2U as audio data of the high frequency range and copy discrimination data IC indicating that the optical disc is an original optical disc prepared from a mother disc. By recording the discrimination data ID, it becomes possible to detect the discrimination data ID at the time of reproduction to render it possible to reproduce audio data DA, processed as upper 16 bits and lower 2 bits, based on the detected results. It is also possible to discriminate, based on the copy discrimination data IC, whether or not the optical disc is one comprising audio data DA copied from an original optical disc.

In a similar manner, the data processing circuit 12 processes the first data D2U, outputted from the bit operating unit 11, in accordance with the format prescribed for the customary compact disc, to generate and output channel data D3 corresponding to the pit string. The channel data D3 corresponding to the pit string is generated and outputted. That is, the data processing circuit 12 appends an error correction code to the first data D2U to interleave the resulting data to EFM to demodulate the processed results. In this EFM modulation, the data processing circuit 12 generates 14 channel bits by periods 14 times the basic period T, from each byte of the first data D2U, as shown in FIG. 2A, and connects bye 14-bit data with 3 connecting channel bits. The data processing circuit 12 NRZI-modulates this serial data string to generate channel data D3, as shown in FIG. 2B. Meanwhile, in the customary compact disc, the laser beam L is on/off controlled responsive to the channel data D3 to produce a pit string with a pit width of 0.5 μm.

Moreover, the data processing circuit 12 performs processing corresponding to the processing unit of the first data D2U of the upper-order 16 bits to add an error correction code to the lower 2-bit second data D2L. The data processing circuit 12 then interleaves the resulting data to convert the interleaved data into serial data. At this time, the data processing circuit 12 appends an error correction code by applying 4-bit-based simply parity. That is, the data processing circuit 12 collects audio data made up of the upper order first data D2U and the lower order second data D2L, in terms of 4 bits as a unit, to generate a block composed of six data (24 bits) to append a 4-bit parity to each block. The data processing circuit 12 interleaves each block comprising the six data (24 bits) and a single parity (4 bits) and appends a 4-bit parity to the interleaved block.

The data processing circuit 12 converts the so-generated pit string into a serial data string. Also, for the time period since conversion of the logical level of the channel data D3 to a logical level corresponding to the pit until its conversion to a logical level corresponding to the land formed between the pits, the data processing circuit 12 generates and outputs light volume control data D4 which sequentially allocates the bits of the serial data.

A driving circuit 13 receives the channel data D3 outputted by the data processing circuit 12 to generate a driving signal S3 the signal level of which intermittently raises the laser beam L in association with the logical level of this channel data D3.

With the recording device 1, the upper 16 bits of the 18 bits making up the audio data DA supplied to this device 1 are recorded as a pit string made up of plural pits $P_1$ on the master disc 2 so that the upper 16 bits will be reproduced by a disc reproducing device adapted for reproducing the customary compact disc.

The driving circuit 13 intermittently raises the light beam L by a light volume control data D4 to generate the driving signal S3 so that a width $W_2$, equal to the length in a direction perpendicular to the track direction, will be varied so as to be narrower than a normal width $W_1$ responsive to the light volume control data D4. This records the second data D2L, recorded on the optical disc, as variation in the width which is the length of the pit in a direction perpendicular to the track direction.

When the light volume control data D4 is recorded by the pit width in this manner, the peak value or the bottom value is changed responsive to the light volume control data D4. In the present example, the pit width is modulated with 0.5±0.1 μm, so that, even if the peak or bottom value is changed as shown in FIGS. 2A to 2D, the 16-bit first data D2U will be reproduced with a sufficient amplitude allowance in a disc reproducing apparatus dedicated to reproduction of the customary compact disc.

(2) Disc Reproducing Apparatus

A disc reproducing apparatus enabling selective reproduction of the optical disc having recorded data thereon and the routine compact disc, according to the present invention, will hereinafter be explained.

Figure 3:
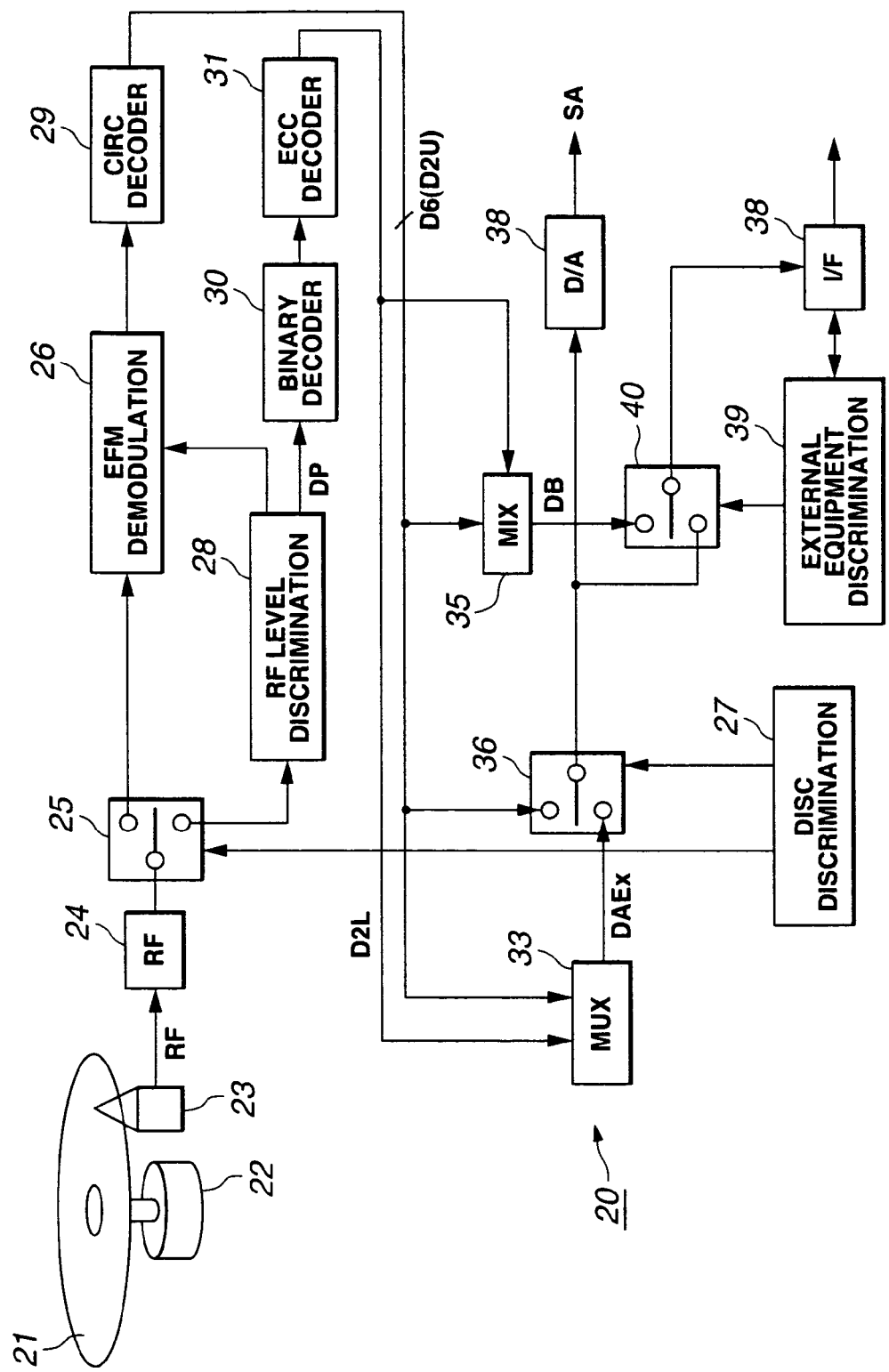
FIG. 3 is a block diagram showing a disc reproduced device used for reproduced an optical disc according to the present invention.

When the optical disc 21 is loaded on the disc reproducing apparatus 20, as shown in FIG. 3, the present disc reproducing apparatus 20 rotationally drives the optical disc 21 under a constant linear velocity by a spindle motor 22 with the reproducing signal RF obtained from the optical pickup 23 as a reference.

The optical pickup 23, employed in this disc reproducing apparatus 20, illuminates a light beam on the optical disc 21 by an enclosed semiconductor laser used as a light source to receive the return light beam reflected from the optical disc 21 by a pre-set light receiving element. The optical pickup 23 outputs a playback signal RF the signal level of which is changed responsive to the intensity of the return light beam received by the light receiving surface of the light receiving element. The reproducing signal RF is changed in signal level responsive to a pit $P_1$ and a land $R_1$ formed on the optical disc 21, while being changed in peak or bottom value in dependence upon the width of the pit formed on the optical disc 1.

The RF circuit 24 amplifies the reproducing signal Rf at a pre-set gain to output the resulting reproducing signal Rf. In the initial state, a selection circuit 25 outputs the reproducing signal Rf, outputted by this RF circuit 24, to an EFM (8-14) demodulating circuit 26. However, if a disc discriminating circuit 27 detects that the loaded optical disc 21 is the optical disc having recorded thereon not only the first data D2U but also the second data D2U, according to the present invention, the selection circuit 25 outputs the reproducing signal Rf to an RF level discriminating circuit 28 under control by the disc discriminating circuit 27.

If the loaded optical disc 21 is the customary optical disc 21, the EFM demodulating circuit 26 bi-level-discriminates the reproducing signal Rf outputted by the RF circuit 24 to generate playback data. The EFM demodulating circuit 26 also EFM demodulates the playback data to output the demodulated data. If conversely the disc discriminating circuit 27 detects that the loaded optical disc 27 is the optical disc according to the present invention, the EFM demodulating circuit 26 EFM-demodulates playback data outputted by the RF level discriminating circuit 28, under control by the disc discriminating circuit 27, to output the demodulated data. Meanwhile, the EFM demodulating circuit 26 outputs playback data corresponding to the repetition of pits and lands, no matter whether the loaded optical disc 21 is an optical disc according to the present invention or a customary compact disc.

A CIRC decoder 29 descrambles output data of the EFM demodulating circuit 26 and corrects the output data for errors by the error correction code appended in recording, to reproduce and output audio data D4. With the disc reproducing apparatus 20 according to the present invention, the audio data D4 is outputted in 16 bits, no matter whether the loaded optical disc 21 is a customary compact disc or an optical disc according to the present invention, in the same way as in signal processing in the disc reproducing device dedicated to reproduction of a customary compact disc. Directly after loading the optical disc 21, the reproducing signal Rf may be processed in a similar manner whereby the variable information recorded in a lead-in area of the optical disc 21 may be reproduced and outputted to a system controller including the disc discriminating circuit 27.

Similarly to the EFM demodulating circuit 26, the RF level discriminating circuit 28 bi-level-discriminates the reproducing signal outputted by the RF circuit 24 to generate playback data to output the playback data to the EFM (8-14) demodulating circuit 26. The reproducing signals Rf are derived from the optical disc 21 according to the present invention, in which the pit width W is modulated by the second data D2L, so that the peak or bottom value is changed in the reproducing signal Rf with the pit width W, as shown in FIGS. 4A and 4B.

Figures 4A, 4B:
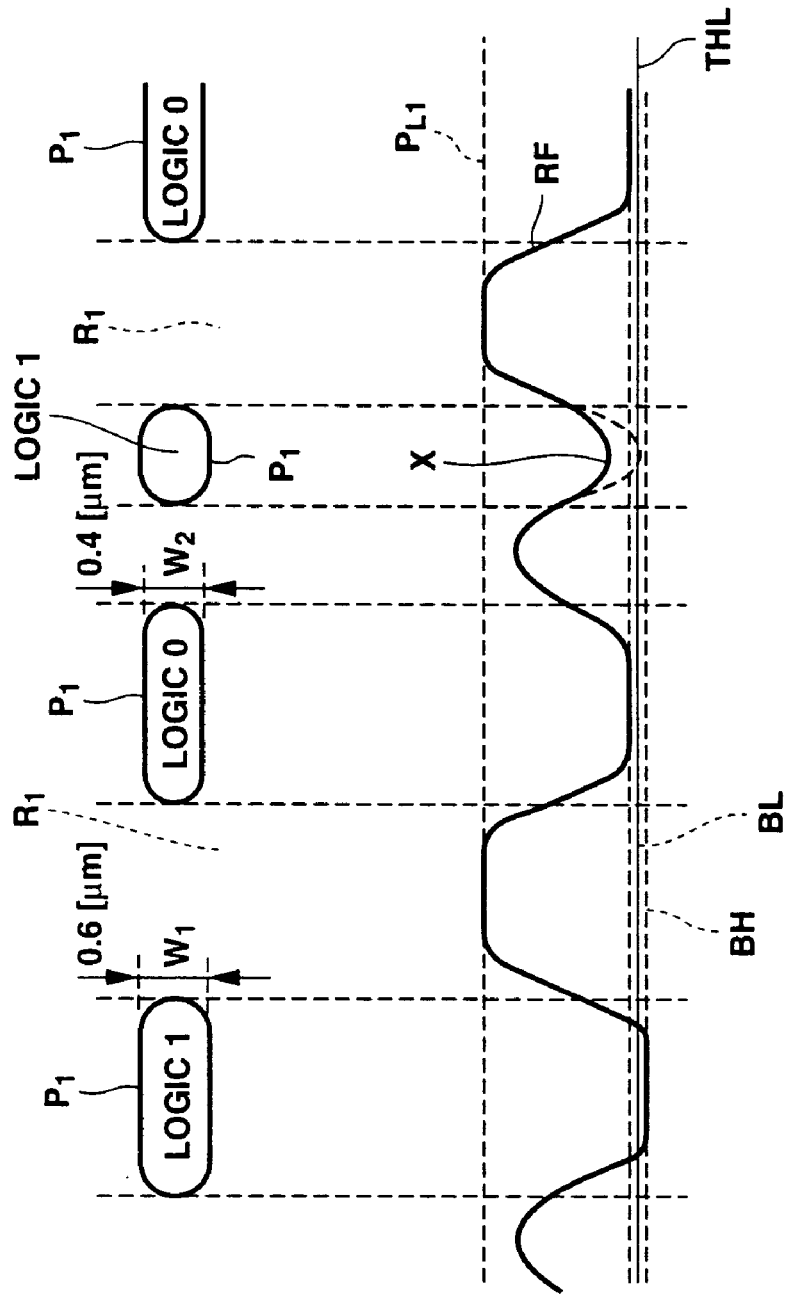
FIGS. 4A and 4B show playback data reproduced by the disc reproducing apparatus shown in FIG. 3.

If the pit width $W_1$ is 0.6 μm for the quality improving data value of logic 1, with the pit width $W_2$ being 0.6 μm for the quality improving data value of logic 0, the bottom value of the reproducing signal Rf is $B_H$ and $B_L$ for the pit width $W_1$ of 0.6 μm and 0.4 μm, as shown for example in FIG. 4B, respectively.

In this manner, the RF level discriminating circuit 28 corrects the threshold value discriminating the first data D2U to bi-level-discriminate the reproducing signal Rf, so that the result of bi-level discrimination will not be affected even if the peak value or the bottom value of the reproducing signal Rf is changed. The RF level discriminating circuit 28 sequentially detects the level of the peak value $B_H$ or the bottom value $B_L$ of the reproducing signal Rf to sequentially detect the signal level of the reproducing signal Rf at the center of each pit. On the other hand, the RF level discriminating circuit 28 corrects the results of the signal level detection by the pit length of the first data D2U obtained on bi-level discrimination to normalize the results of signal level detection responsive only to the pit width.

That is, with the pit length of a period approximately equal to or less than 4T, the reproducing signal Rf, modulated based on the second data D2L, has its peak or bottom value changed with the period, such that, if the pit length is equal to or longer than 5T, the peak or bottom value shows a saturated value, that is the level BL. The RF level discriminating circuit 28 multiplies the result of signal level detection with a pre-set constant consistent with the length of the pit $P_1$ in the first data D2U. Specifically, the RF level discriminating circuit 28 multiplies the result of signal level detection with a pre-set constant proportionate to the length of the pit $P_1$ in the first data, such as 1 when the pit length is of the period not less than the period 5T or a constant inversely proportionate to the pit length when the pit length is not less than the period 4T. Specifically, the level X of the reproducing signal Rf corresponding to the pit length shown in FIG. 4B is normalized to the level $B_L$. The RF level discriminating circuit 28 outputs the result of the normalized signal level detection results DP to a bi-level demodulation circuit 30.

The bi-level demodulation circuit 30 bi-level-discriminates the normalized signal level detection results DP based on a pre-set threshold value, for example, an intermediate level THL between the level $B_L$ and the level $B_H$ to reproduce second data. Specifically, the bi-level demodulation circuit 30 outputs 1 or 0 as second data when the signal level detection results DP is lower or higher than a threshold value THL, respectively.

An ECC decoder 31 corrects payback data outputted by the bi-level demodulation circuit 30 for errors and de-interleaves the resulting data to reproduce and output 2-bit second data D2L(D6). If the loaded optical disc 21 is a customary compact disc, and the audio data D6 is processed with exclusive-OR in a mixer 35 as later explained, 2-bit logic "00" data is outputted in place of the 2-bit second D2L. If the audio data D6 is processed with multiplication in the mixer 35, a 2-bit data string by pre-set random number data is sequentially outputted.

A multiplexer (MUX) 33 appends 2-bit parallel second data D2L outputted by the ECC decoder 31 to the lower bit side of the 16-bit parallel first data D2U outputted by the CIRC decoder 29 to output 18-bit parallel audio data. This permits the multiplexer (MUX) 33 to output audio data DAEx, capable of reproduced the high sound quality with a broad frequency range, provided that the optical disc 21 is an optical disc according to the present invention.

A mixer (MIX) 35 processes the lower two bits of the 16-bit parallel audio data, outputted by the CIRC decoder 29, with each bit of the second data D2L, outputted by the ECC decoder 31, by exclusive-OR, to output audio data DB of a narrow frequency range not containing the second data D2L outputted by the CIRC decoder 29. If data by random number is to be outputted by the ECC decoder 31, the mixer 35 multiplies the lower two bits of the audio data with the random number data to output audio data DB not containing the second data D2L.

The disc discriminating circuit 27 is constituted by a system controller, which, when the optical disc 21 is loaded, performs a seek operation of scanning the inner and outer rims of the optical disc 21 at a high speed, by way of seeking, to acquire the information concerning the number of musical airs or the playing time, recorded on the optical disc 21, to demonstrate the acquired information on pre-set display means. The system controller also acquires disc discrimination data ID of the optical disc 21 to verify whether the optical disc 21 is the customary compact disc or an optical disc according to the present invention, in accordance with the disc discrimination data ID. The disc discriminating circuit 27 controls the switching of the contacts of the selection circuits 25, 26 based on the discriminated results.

If, s a result of check obtained on reproducing the data recorded in a lead-in area of the optical disc 21, the disc discriminating circuit 27 has verified that the loaded optical disc 21 is the optical disc according to the present invention, the disc discriminating circuit 27 processes the reproducing signal Rf outputted by the RF circuit 24 by the RF level discriminating circuit 28 to reproduce the audio data DAEx of the wide frequency range containing the first data D2U and the second data D2L.

If the optical disc 21 is the customary compact disc, a selection circuit 36 selectively outputs the audio data D6, outputted by the CIRC decoder 29, to a digital/analog (D/A) conversion circuit 37. If conversely the optical disc 21 is an optical disc having not only the first data D2U but also the second data D2L recorded thereon, in accordance with the present invention, the selection circuit 36 selectively outputs audio data of a wide frequency range, synthesized from the first data D2U and the second data D2L outputted by the multiplexor 33.

The digital/analog conversion circuit 37 digital-to-analog converts the audio data outputted by the selection circuit 36 to output audio data SA by analog signals. Thus, with the playback sound quality by analog signals, if the disc is the customary compact disc, the disc reproducing apparatus 20 selectively processes the audio data D6 outputted by the CIRC decoder 29 to reproduce the sound with the sound quality equivalent to the conventional 16-bit sound quality, indicated as CD sound quality in Table 1, whereas, if the disc is the optical disc 21 according to the present invention, the disc reproducing apparatus 20 selectively processes the 18-bit equivalent audio data DAEx of a broad frequency range, indicated as ExCD sound quality in Table 1, synthesized from the first data D2U and the second data D2L outputted by the multiplexor 33.

In a conventional disc reproducing apparatus, dedicated to reproduction of the customary compact disc, the audio data D6, outputted by the CIRC decoder 29, is outputted without the intermediary of the mixer 35, so that the conventional disc reproducing apparatus reproduces the audio data recorded on the customary compact disc and on the optical disc of the present invention with the CD sound quality comparable to that of the customary compact disc.

TABLE 1

| disc | | reproduced sound quality | duplication on CD |
|---|---|---|---|
| conventional disc reproducing apparatus | CD disc | CD sound quality | CD sound quality |
| | ExCD disc | CD sound quality | CD sound quality |
| inventive disc reproducing apparatus | CD disc | CD sound quality | FM sound quality (CD sound quality) (conventional PC) CD sound quality (second duplication inhibited PC) |
| | ExCD disc | ExCD sound quality | FM sound quality (conventional PC) ExCD sound quality (CD sound quality) (second duplication inhibited PC) |

An interface (I/F) 38 constitutes an input/output circuit for transmitting/receiving variable data with an external equipment etc to output audio data to a personal computer in accordance with the SCMS format or to transmit/receive variable data relevant to audio data.

Similarly to the disc discriminating circuit 27, an external equipment discriminating unit 39 is constituted by a system controller of the present disc reproducing apparatus 20 and executes pre-set authorization processing with an external equipment through an interface 38. In this authorization processing, the external equipment discriminating unit 39 sends pre-set data to the external equipment and, subject to the response from the external equipment to this data, verifies whether or not the computer connected to the interface 38 is an authentic equipment which inhibits second duplication of the audio data recorded on the optical disc 1 to protect the copyright.

The equipment which protects the copyright is such an equipment having the function of inhibiting so-called second copying by re-duplicating a whole copy once obtained from data containing the audio data recorded on the optical disc. If the external equipment is a personal computer and an optical disc which has duplicated the audio data outputted from the disc reproducing apparatus 20 is to be prepared, this personal computer is the equipment protecting the copyright if it has the function of correctly setting the duplication discriminating data IC. This computer is shown in Table 1 as being a second duplication inhibiting PC in contradistinction from a conventional personal computer A selection circuit 40 operates, based on the results of discrimination of the external equipment discriminating unit 39, so that, if the external equipment is an authentic equipment inhibiting second duplication of audio data recorded on the optical disc, the selection circuit 40 selectively outputs audio data outputted by the selection circuit 36, whereas, if the external equipment is not an equipment not having the function of inhibiting second duplication of audio data, the selection circuit 40 selectively outputs audio data DB outputted by the mixer 35. Thus, if the external equipment is an authentic equipment inhibiting second duplication, and the optical disc 21 is a customary compact disc, the selection circuit 40 outputs audio data of the 16-bit equivalent sound quality, whereas, if the optical disc 21 is the customary compact disc or the optical disc according to the present invention, only data corresponding to the first data D2U having the 16-bit equivalent sound quality may be outputted. For a customary compact disc, audio data by the 16-bit equivalent sound quality may be outputted, as in the conventional equipment. The sound quality in such case is indicated as the FM sound quality in Table 1.

Meanwhile, if the external equipment is an authentic equipment inhibiting second duplication, the present disc reproducing apparatus 20 is able to switch the contacts of the selection circuit 36 in an interlocked relation to the selection circuit 40 to output 16-bit equivalent audio data equivalent to the audio data recorded on the customary compact disc.

(3) Data Recording Operation and Audio Reproducing Operation by a Recording Device For producing an optical disc according to the present invention, using the recording device 1, shown in FIG. 1, the audio signals SA for recording, supplied to the recording device 1, is converted by an analog/digital conversion circuit 10 into 18-bit audio data DA, which audio data DA is split by the bit operating unit 11 into the first data D2U by upper 16 bits and the second data D2L by the lower 2 bits. To the first data D2U by the upper 16 bits, an error correction code is appended in the same way as in preparing the customary compact disc, by the data processing circuit 12. The resulting data is interleaved and modulated by EFM. The 14-channel bit data by the EFM modulated data, produced as described above, are connected by connecting bits of 3 channel bits to generate channel data D3. The first data D2U by the upper 16 bits are recorded on the optical disc as a repetition of pits $P_1$ and lands $R_1$, by the light beam L being turned on and off by the channel data D3 to sequentially expose the master disc 2 to light.

The first data D2U, made up of upper 16 bits, is recorded on the optical disc as data reproducible by the disc reproducing device adapted for exclusively reproducing the customary compact disc.

On the other hand, the audio data D2L of the lower 2 bits are collected in terms of 4 bits as a unit as audio data of the frequency range higher than that of the first data D2U to form a block composed of six data (24 bits). A 4-bit parity is appended to each block. Each block composed of 6 data (24 bits) and a single parity (4 bits) are interleaved and a 4-bit parity is appended to the interleaved data.

The audio data D2L of the lower 2 bits, to which the error correction code has been appended as described above, are interleaved and substantially converted into serial data D4. The serial data then is allotted to pits so that each bit of the serial data D4 is in association with one pit. The light volume of the light beam L is switched depending on the logical level of the serial data during the time period the master disc 2 is exposed to light. In this manner, the second data D2L, which enlarges the playback frequency range by the lower two bits, is sequentially recorded on the optical disc by changes in the pit width W, as shown in FIGS. 2A to 2D.

In exposing the master disc 2 to light in this manner, a lead-in area is formed by TOC data outputted by a pre-set server. By the disc discrimination data ID, allotted to the TOC data, it is possible to discriminate whether the optical disc is an optical disc in which 18-bit audio data has been split into the upper 12 bits and the lower 2 bits, or a customary compact disc. Similarly, by the copy discrimination data IC, it is similarly possible to discriminate whether the optical disc is an original optical disc or an optical disc on which audio data has once been duplicated.

With the optical disc 21, thus prepared, playback signals detected by the optical pickup 23 are amplified by an RF circuit 24 and demodulated by the EFM demodulating circuit 26 to generate playback data which then is descrambled and corrected for errors to reproduce 16-bit audio data D6.

In a disc reproducing apparatus for reproducing the customary compact disc, the audio data D6 outputted by the CIRC decoder 29 is outputted to an external equipment, while being outputted as converted analog signals. In this manner, 16-bit audio data is outputted directly or as converted analog signals, when the customary compact disc is loaded on a disc reproducing apparatus adapted for exclusively reproducing the customary compact disc, or when an optical disc having recorded thereon the first data D2U and the second data D2L according to the present invention is loaded thereon.

An optical disc according to the present invention can also be reproduced by a disc reproducing apparatus adapted for exclusively reproducing the customary compact disc, thus assuring lower compatibility with respect to the disc reproducing apparatus adapted for exclusively reproducing the customary compact disc.

In the disc reproducing apparatus 20 capable of reproducing the optical disc according to the present invention, the disc discrimination data ID is detected from the TOC data of the lead-in area. From this disc discrimination data ID, it can be discriminated whether the loaded optical disc 21 is the customary compact disc or the optical disc according to the present invention.

When the customary compact disc is loaded, the 16-bit audio data D6 outputted by the CIRC decoder 29 is inputted to the digital/analog conversion circuit 37 through the selection circuit 36 where the audio data is converted into audio signals SA by analog signals. Thus, when the customary compact disc is loaded on the disc reproducing apparatus 20, audio signals are reproduced with the 16-bit equivalent sound quality, as conventionally.

When the optical disc, having recorded thereon the first data D2U and the second data D2L, is loaded, the reproducing signal Rf outputted by the reproducing signal Rf is inputted through the selection circuit 25 to the RF level discriminating circuit 28 where the playback data by the repetition of pits and lands are detected. The playback data is processed in a similar manner to the case of processing the playback data of the customary compact disc to output the 16-bit first data D2U from the CIRC decoder 29.

In the RF level discriminating circuit 28, the peak or bottom value of the reproducing signal Rf corresponding to the mid point of the pit is detected. From the result of the signal level detection, by this peak or bottom value, the variation by the pit length is corrected, and the result of signal level detection DP, represented by changes in the signal level with the pit width, is detected. The result of signal level detection DP is bi-level discriminated and playback data by the second data D2L of the lower two bits is detected, as shown in FIGS. 4A and 4B. This playback data is corrected for errors by the ECC decoder 31 and deinterleaved and the second data D2L of the lower 2 bits is reproduced. In the multiplexor 33, the second data D2L of the lower 2 bits are appended to the lower side of the first data D2U of the upper 16 bits, outputted by the CIRC decoder 29, to generate the 18-bit audio data DAEx of the broad frequency range. On the other hand, the second data D2L is multiplied or EX-ORed in the mixer 35 with the lower two bits of the upper 16-bit first data D2U to generate 16-bit audio data DB of the frequency range not containing the high frequency range.

In the disc reproducing apparatus 20 of the present invention, the audio data DAEx of the broad frequency range containing the high frequency range is outputted by analog signals through the digital/analog conversion circuit 37 to reproduce the audio signals DAEx enabling the audio reproduction of 18-bit equivalent high-quality signals.

When the disc reproducing apparatus 20 is to output the audio data obtained from the customary compact disc, or the audio data obtained from the optical disc according to the present invention, to an external equipment, authorization processing is executed through the interface 38 with the external equipment to verify whether or not the external equipment is an equipment which disregards the code by the SCMS, such as the customary personal computer. By this decision, it is verified whether or not the external equipment connected to the disc reproducing apparatus 20 is an authentic equipment inhibiting second duplication. If the external equipment is the authentic equipment inhibiting second duplication, the audio data of the high frequency range containing the first data D2U and the second data D2L outputted by the multiplexor 33 is outputted to the external equipment through the selection circuit 36, selection circuit 40 and the interface 38. If the loaded optical disc is the customary compact disc, the 15-bit audio data, outputted by the CIRC decoder 29, is outputted to the external equipment through the selection circuit 36, selection circuit 40 and the interface 38. In this manner, the audio data of the broad frequency range containing the high frequency range is outputted to the external equipment. If this external equipment is the authentic equipment inhibiting second duplication, the audio data, once duplicated, cannot be duplicated further to prevent the profits inherent to the copyright from being impaired by repeated duplication.

If the external equipment connected to the disc reproducing apparatus 20 is an equipment not having the function of inhibiting the second duplication, audio data DB, deteriorated in sound quality by repeated duplication of audio data a large number of times when outputted from the mixer 35, is outputted to the external equipment via the selection circuit 40 and the interface 38, such that, if copying of digital signals over an unlimited number of times is likely to be allowed, audio data deteriorated in the sound quality is outputted, in such a manner that the merit of duplication by digital signals that repeated duplication does not lead to deterioration in the sound quality is not exploited.

If the external equipment connected to the disc reproducing apparatus 20 is such an equipment which has the function of inhibiting second duplication, the copying discrimination data IC is set correctly for the duplication in which the audio data of the broad frequency range containing the high frequency range inclusive of the first data D2U and the second data D2L is outputted and prepared, so that, when the audio data is reproduced by an equipment different from the present disc reproducing apparatus 20, it is possible to prevent second duplication of the audio data by e.g., the SCMS system, based on this copy discrimination data IC, thereby protecting the profits accrued to the copyright.

In the optical disc 21 of the present invention, in which plural bits formed based on the first data D2U are deformed in width corresponding to the length in the direction perpendicular to the track direction, based on the second data D2L, and are recorded as the second data D2L. Therefore, if a misconception that the external equipment connected to the disc reproducing apparatus 20 reproducing the optical disc 21 is the authentic equipment having the function of inhibiting the second duplication is willfully produced to output 18-bit audio data of the broad frequency range containing the high frequency range inclusive of the first data D2U and the second data D2L, it becomes difficult to copy the entire audio data including the first data D2U and the second data D2L to render it possible to prevent duplication of the audio data which enables audio reproduction of the desired broad frequency range. The result is that repeated duplication of audio data enabling audio reproduction of high sound quality is prohibited to protect the profits of the copyright owner by duplication.

With the optical disc according to the present invention, the audio data DA by 18 bits is split into the first data D2U by the upper 16 bits and the second data D2L by the lower 2 bits, the first data D2U by the upper 16 bits is recorded by repetition of pits $P_1$ and lands $R_1$ between the pits $P_1$, while the second data D2L is recorded by lower two bits by changes in the pit width, whereby it is possible to furnish high-quality audio signals enabling reproduction of the broad frequency range containing the high frequency range as well as reproduction by a disc reproduction apparatus adapted for exclusively reproducing the customary compact disc. In addition, it is possible to prevent repeated duplication of audio data DAEx enabling the high quality audio reproduction.

In addition, by discriminating whether or not the external equipment connected to the disc reproducing apparatus 20 has the function of inhibiting the second duplication, and by outputting audio data containing only the first data D2U by the upper 16 bits or audio data containing both the first data D2U and the second data D2L, it is possible to prevent repeated duplication of the audo data DAEx which enables reproduction of the high sound quality audio signals.

Furthermore, if, in reproducing the optical disc according to the present invention by a disc reproducing apparatus, the audio reproduction obtained on reproducing the first data D2U by the second data D2L is rdeteriorated in sound quality, it is similarly possible to protect the profits of the copyright owner by duplication of the audio data DAEx which enables audio reproduction of desired high sound quality.

(4) Second Embodiment

In the present embodiment, as in the previous first embodiment, 18-bit audio data is split into first data D2U of upper 16 bits and second data D2L of lower 2 bits, the first data D2U of the upper 16 bits are processed identically as in the customary compact disc and recorded by lands $R_1$ between plural pits $P_1$, whilst the second data D2L of the lower 2 bits are recorded by varying the length $P_L$ in the track direction of the pit $P_1$ from the normal length.

In the present embodiment, the above-described recording device 1 and the disc reproducing apparatus 20 may be used except recording the second data D2L on the optical disc by varying the width W which is the length in the direction perpendicular to the track direction. Therefore, the recording device 1 and the disc reproducing apparatus 20 are explained with reference to FIGS. 1 and 3, respectively.

In the recording device 1, used here, a data processing circuit 2 appends an error correction code to the second data D2L of the lower bits and interleaves the resulting data to generate a serial data string, as in the first embodiment described above. The data processing circuit 2 generates and outputs pit length control data D4, in which respective bits of the serial data are sequentially allotted to a time period as from the time the logical level of a channel data D3 is switched to the logical level corresponding to the pit until it is switched to the logical level corresponding to the land.

A driving circuit 3 is fed with channel data D3, outputted from the data processing circuit 2, and generates a driving signal S3, the signal level of which corresponding to the logical level of the channel data D3 rises intermittently. At this time, the driving circuit 3 drives a monovibrator by a pit length control data D4 and generates a driving signal S3 by the resulting timing signal and the channel data D3 so that the pit length will be changed depending on the logical level of the pit length control data D4, with a time period sufficiently shorter than the ½ period of the channel data D3, as shown in FIGS. 5A to 5D, as a unit. The variation of the pit length is set to enable processing of the reproducing signal Rf with a sufficient phase allowance even by a disc reproducing device adapted for exclusively reproducing the customary compact disc. In the present embodiment, the pit length variation is set so that the pit length will be varied by ±0.1 µm, depending on the pit length control data D4, so that the pit length will be increased or decreased about the length at the bit cell boundary as the reference length as center.

By slightly changing the length $P_{L1}$ in the track direction of the pit recorded based on the first data D2U from the normal length $P_L$, the second data D2L of the frequency range higher than the frequency range of the first data D2U is recorded on the optical disc.

If, when the optical disc 21, having recorded thereon the second data D2L by slightly changing the length $P_{L1}$ in the track direction of the pit $P_1$ from the normal length $P_L$, is loaded on the disc reproducing apparatus and reproduced, the reproducing signal Rf is bi-level-discriminated with a pre-set threshold value, the time period in register with the pit $P_1$ in which the signal level is decaying or the time period in register with the pit $P_1$ in which the signal level is rising is varied depending on the logical level of the pit length control data D4. Alternatively, in the reproducing signal level or the logical level of the bi-level signal, obtained on sequentially sampling the rising or falling edge of the bi-level signal, the signal level or the logical level of a timing corresponding to the trailing edge of the pit $P_1$, with respect to the channel clock as a reference, is varied depending on the logical level of the pit length control data D4. The length in the track direction of the pit $P_1$ in the optical disc 21 is slightly changed from its normal length, by time measurement of the bi-level signal or the logical level of the reproducing signal level or the bi-level signal, with the clock signal as a reference, to reproduce the second data D2L.

Based on this detection principle, the RF level discriminating circuit 28 and the bi-level demodulation circuit 30 bi-level-discriminates the reproducing signal Rf, using channel clocks reproduced from the reproducing signal Rf as in the EFM demodulating circuit in the disc reproducing apparatus configured for exclusively reproducing the customary compact disc, as a reference, to generate playback data, while detecting from the reproducing signal Rf the second data D2L enabling reproduction of a broad frequency range containing a frequency range higher than the reproducing signal Rf. That is, the RF level discriminating circuit 28 binary-codes the reproducing signal Rf at a pre-set threshold to generate bi-level signals and outputs time measurement results of the bi-level signals to the bi-level demodulation circuit 30. Alternatively, the RF level discriminating circuit 28 sequentially detects the signal level of the reproducing signal Rf or the logical level of the bi-level signals, with the channel clocks as the reference, and outputs, from the result of the detection, the result of signal level detection DP or the result of logical level detection DP of a timing corresponding to the trailing edge.

The bi-level demodulation circuit 30 verifies the output results of the RF level discriminating circuit 28 to detect the playback data of the second data D2L containing the high frequency range.

With the optical disc 21 of the present embodiment, the results similar to those of the above-described first embodiment can be achieved if, by slightly changing the length in the track direction of a pit recorded based on the first data D2U from its normal length, recording is made of the second data D2L of a frequency range higher than the frequency range of the first data D2U. By changing the length in the track direction of the pits by increasing/decreasing a length centered about the length up to a point corresponding to the pit cell boundary, the effect of jitter during reproduction can be decreased to a practically sufficient level.

(5) Third Embodiment

With an optical disc 21 of the present embodiment, the 18-bit audio data are split into upper 16-bit first data D2U and lower 2-bit second data D2L, and the upper 16-bit first data D2U are processed as in the customary compact disc and recorded as a string of plural pits $P_1$, as in the above-described first embodiment, whilst the lower 2-bit second data D2L are recorded by varying the depth $P_{D1}$ of the pit $P_1$ from the normal depth $P_D$.

In the recording device 1 used for preparing the optical disc 21, the resist is selected so that the degree of light exposure will be changed mainly in the depth-wise direction of the pit by changes in the light volume of the laser beam L.

By recording the second data D2L as the depth of pit formed in the optical disc 21 is changed from the normal depth, the peak or bottom value is changed, responsive to the second data D2L, when the data recorded on the optical disc 21 is reproduced, as in the first embodiment described above. In the present embodiment, the second data D2L is recorded as the depth is changed from the normal depth $P_D$ to a depth $P_{D1}$ by ±0.01 µm, so that, even when the peak or bottom value is changed in this manner, audio data corresponding to the upper 16-bit first data D2U will be reproduced with a sufficient amplitude allowance in the disc reproduction apparatus used exclusively for reproducing the customary compact disc.

If the second data D2L is recorded as the depth of the pit $P_1$ is changed from the normal depth $P_D$, the playback signals obtained on reproducing the optical disc 21 are changed in the peak or bottom value responsive to the second data D2L as in the first embodiment, so that it is possible to selectively process the audio data DAEx synthesized from the first data D2U and the second data D2L outputted by the multiplexor 33 by the disc reproducing apparatus 20 of the present invention shown in FIG. 3 to make audio reproduction with the high sound quality (ExCD sound quality) covering the frequency range equivalent to 18 bits.

(6) Fourth Embodiment

Figure 7A:
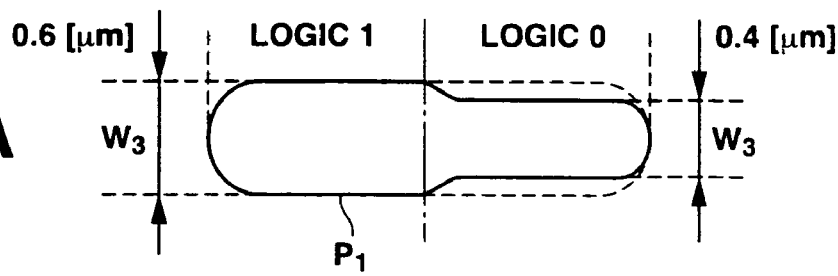
FIGS. 7A and 7B are plan views showing the structure of pits formed in an optical disc according to a fourth embodiment of the present invention.
Figure 7B:
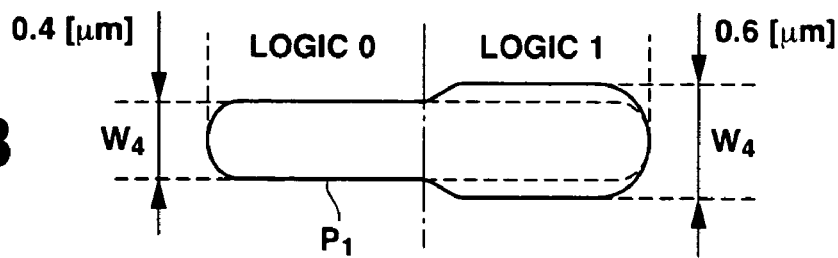

With the present embodiment of the optical disc, similarly to the above-described first embodiment, the upper 16-bit first data D2U of the 18-bit audio data is processed in the same way as in the customary compact disc and recorded as plural pits $P_1$, whilst the lower 2-bit second data D2L is recorded by changing a width $W_3$ of the pit which is the length perpendicular to the length in the track direction of the pit $P_1$. By the pit width being changed with the second data D2L, a pit with a length longer than a pre-set length, such as a pit not shorter than 5T, is selectively used, and a 1-bit data is allotted to the former and latter halves from the center $P_0$ of the pit $P_1$ to change the pit width $W_4$, as shown in FIGS. 7A and 7B.

The optical disc of the present embodiment is similar to the optical disc of the first embodiment, except the difference in timing in modulating the pit width $W_3$. Therefore, the optical disc of the present embodiment can be prepared, using the recording device 1 shown in FIG. 1, while the optical disc can be reproduced using the disc reproducing apparatus 20 shown in FIG. 3.

In the recording device 1, an error correction code is appended to the lower 2-bit second data D2L and the resulting data is intereleaved to form a serial data string, by the data processing circuit 12, as in the first embodiment described above. The data processing circuit 12 monitors the logical level of a sustained pit $P_1$ in the channel data D3 to detect the timing corresponding to the pit $P_1$ having a length not less than a pre-set length, such as 5T or longer. This data processing circuit 12 allots each 1 bit data to the former and latter halves in the track direction of the pit not less than the pre-set length to generate and output the light volume control data D4.

In the disc reproducing apparatus 20 for reproducing the optical disc, shown in FIG. 3, the reproducing signal Rf is bi-level-discriminated, with the channel clocks regenerated by the reproducing signal Rf as reference, by signal processing similar to that performed by the EFM demodulation circuit in the disc reproducing apparatus exclusively reproducing the customary compact disc, to generate playback data, which is outputted to the EFM demodulating circuit 26.

The RF level discriminating circuit 28 detects from the playback data the signal level decay or rise timing for longer than a pre-set period to detect the pit $P_1$ in which is recorded the second data D2L of a frequency range higher than the frequency range of the first data D2U. The RF level discriminating circuit 28 then detects the signal level of the reproducing signal Rf at a pre-set timing in the former and latter portions in the track direction as from the lengthwise center in the track direction of the pit $P_1$. The RF level discriminating circuit 28 outputs the result of signal level detection DP of the reproducing signal Rf to the next following bi-level demodulation circuit 30, which then verifies the output result of the RF level discriminating circuit 28 to detect the playback data of the high frequency range second data D2L.

With the optical disc of the present embodiment, the result similar to that of the above-described first embodiment is achieved when the lower 2-bit second data D2L is recorded by changes in the pit width $W_4$ of the pit $P_1$ of a length not less than a pre-set length to the former and latter portions of which are each allotted one bit.

(7) Fifth Embodiment

In the optical disc of the present embodiment, the upper 16-bit first data D2U of the 18-bit audio data are processed as in the customary compact disc and thereby recorded as a string of plural pits $P_1$, while the lower 2-bit second data D2L is recorded as the depth $P_{D1}$ of the pit $P_1$ recorded on the optical disc is varied from its normal depth $P_D$. As the pit $P_1$, the normal depth $P_D$ of which is changed by this second data D2L, a pit having a duration not less than a pre-set length, such as 5T or longer, is selected, and each 1-bit is allocated and recorded as the normal depth is changed in the former and latter portions as from the center of the pit $P_1$.

The optical disc of the present embodiment also is formed using the recording device 1 shown in FIG. 1 and is reproduced using the disc reproducing apparatus 20 shown in FIG. 3.

For recording the second data D2L on the second embodiment of the optical disc, using the recording device shown in FIG. 1, the light volume of the laser beam L is controlled, whilst the depth $P_{D1}$ of the pit $P_1$ is varied from its normal depth by selective light exposure in the depth-wise direction made possible by resist selection.

By reproducing the optical disc using the disc reproducing apparatus shown in FIG. 3, the audio data DAEx synthesized from the first data D2U and the second data D2L can be selectively processed to effect audio reproduction with a high sound quality (ExCD sound quality) with a frequency range equivalent to 18 bits.

(8) Sixth Embodiment

In the optical disc of the present embodiment, the upper 16-bit first data D2U of the 18-bit audio data are processed as in the customary compact disc and thereby recorded as a string of plural pits $P_1$, while the lower 2-bit second data D2L is recorded by changes in the width W of the pit $P_1$ corresponding to the length in the direction perpendicular to the track direction of the pit $P_1$ recorded on the optical disc. As the pit $P_1$, the width of which is changed based on the second data D2L, a pit $P_1$ of a length not less than a pre-set length, such as a pit $P_1$ not less than 5T, is used, and the second data D2L is recorded by changes in the width of the pit $P_1$ from the former half to the latter half as from the center in the track direction of the pit $P_1$.

Figure 8A:
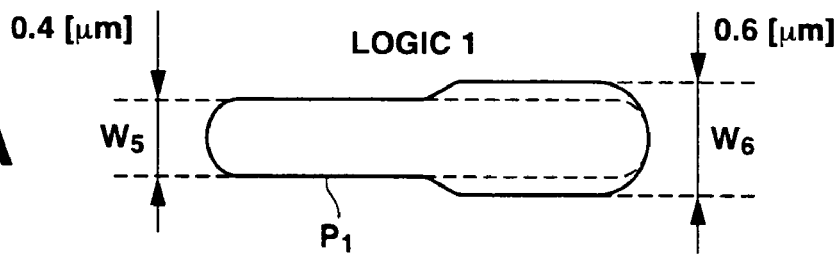
FIGS. 8A and 8B are plan views showing the structure of pits formed in an optical disc according to a sixth embodiment of the present invention.
Figure 8B:
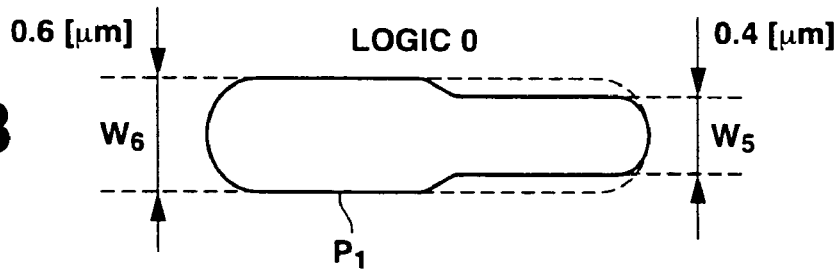

Referring to FIGS. 8A and 8B, the pits $P_1$ are formed so that, if the logical level is the logical "1", the width W6 of the pit $P_1$ of the second data D2L is increased with the lengthwise mid point in the track direction of the pit $P_1$ as a boundary, whereas, if the logical level is the logical "0", the Width $W_5$ of the pit $P_1$ of the second data D2L is decreased with the lengthwise mid point in the track direction of the pit $P_1$ as a boundary.

In the recording device 1 for recording data on the present embodiment of the optical disc, as in the first embodiment described above, an error correction code is appended to the lower 2-bit second data D2L, and the resulting data is interleaved to generate a serial data string. Moreover, the data processing circuit 12 monitors the logical level of consecutive bits in the channel data D3 to detect the timing corresponding to the pit $P_1$ of not less than the pre-set length, such as not less than 5T. This data processing circuit 12 allocates each 1 bit data to the former and latter portions in the track direction of the pit $P_1$ of not less than the pre-set length to generate and output the light volume control data D4.

The RF level discriminating circuit 28 of the disc reproducing apparatus 20 for reproducing the optical disc, shown in FIG. 3, performs signal processing similar to that performed by the EFM demodulation circuit in the disc reproducing apparatus exclusively reproducing the customary compact disc to perform bi-level discrimination of the reproducing signal Rf, with the channel clocks reproduced from the reproducing signal Rf as reference, to generate playback data, which is outputted to the EFM demodulating circuit 26.

The RF level discriminating circuit 28 detects, from the playback data, the timing at which the signal level rises or decays at a period longer than the pre-set period, to detect the pit $P_1$ in which is recorded the second data D2L of a frequency range higher than the frequency range of the first data D2U to detect the signal level of the reproducing signal Rf at a pre-set timing before and after the lengthwise center along the track of the pit $P_1$. The RF level discriminating circuit 28 outputs the result of signal level detection DP of the reproducing signal Rf to the next following bi-level demodulation circuit 30, which then verifies the output result of the RF level discriminating circuit 28 to detect the playback data of the second data D2L of the high frequency range.

With the optical disc of the present embodiment, it is possible to achieve the results similar to those of the first embodiment if the lower 2-bit second data D2L is recorded by changes in the pit widths $W_5$, $W_6$ of pits allocated to the former and latter half portions in the track direction of the pit $P_1$ of a length not less than the pre-set length.

(9) Seventh Embodiment

In the present embodiment of the optical disc, the upper 16-bit first data D2U of the 18-bit audio data is processed as in the customary compact disc, whilst the lower 2-bit second data D2L is recorded by changes in the depth $P_D$ of the pit $P_1$ recorded on the optical disc. As the pit having its depth changed based on the second data D2L, such a pit having a length not less than a pre-set length, such as a pit not less than 5T, is used, and the second data D2L is recorded by changing the depth from the former to the latter half sides as from the center in the track direction of the pit.

Figure 9A:
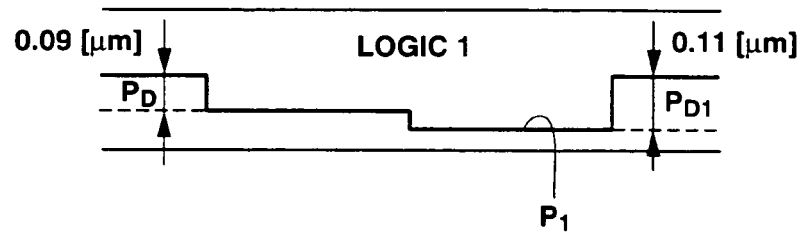
FIGS. 9A and 9B are plan views showing the structure of pits formed in an optical disc according to a seventh embodiment of the present invention.
Figure 9B:
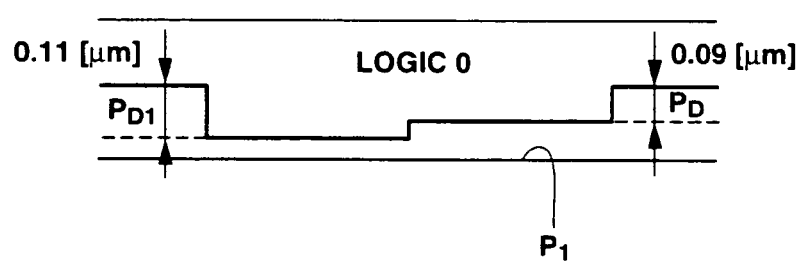

The pits of the second data D2L are sequentially formed so that, if the logical level is "1", the depth $P_{D1}$ of the pit $P_1$ will be deeper with the mid portion in the lengthwise direction along the track of the pit as the boundary, whereas, if the logical level is "0", the depth $P_{D1}$ of the pit $P_1$ will be shallower with the mid portion in the lengthwise direction along the track of the pit $P_1$ as the boundary, as shown in FIG. 9.

The optical disc of the present embodiment can be formed by employing the recording device 1 shown in FIG. 1, whilst it can be reproduced using the disc reproducing apparatus 20 shown in FIG. 3.

For recording the second data D2L on the optical disc of the present embodiment, using the recording device shown in FIG. 1, the light volume of the laser beam is controlled, whilst the pit depth is changed from its normal depth by selective light exposure by resist selection.

By reproducing the optical disc by the disc reproducing apparatus shown in FIG. 3, the audio data DAEx, synthesized from the first data D2U and the second data D2L, can be selectively processed to achieve audio reproduction with the high sound quality (ExCD sound quality) with the broad frequency range equivalent to 18 bits.

(10) Eighth Embodiment

Figure 10A:
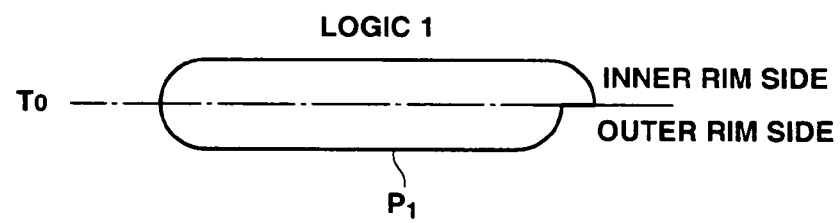
FIGS. 10A and 10B are plan views showing the structure of pits formed in an optical disc according to an eighth embodiment of the present invention.
Figure 10B:
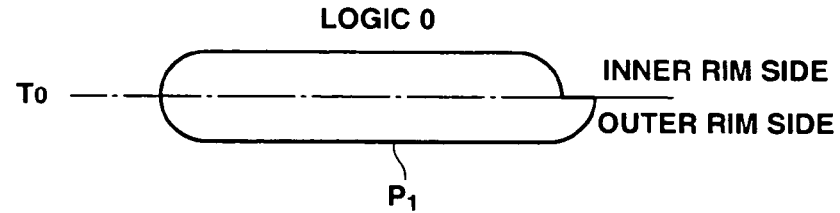

In the optical disc of the present embodiment, the upper 16-bit first data D2U of the 18-bit audio data are processed as in the customary compact disc and thereby recorded as a string of plural pits $P_1$, whilst the pit of the track constituted by the plural pits $P_1$ recorded on the optical disc and the lands delimited between these pits $P_1$ has its length changed from its normal length in the track direction on the left and right sides of the track center $T_0$ as center, to record the second data D2L, as shown in FIGS. 10A and 10B.

The pit whose width is changed based on the second data D2L is a pit not shorter than a pre-set length, for example, a pit not less than 5T. The second data D2L is recorded by changes in pit width from the former half to the latter half portions of the pit as from the center along the track. That is, the pit $P_1$ in which is recorded the second data D2L has the length along the track changed on the left and right sides of the track direction of the pit $P_1$, that is on the inner and outer rims of the optical disc.

The pits of the second data D2L are formed sequentially so that, if the logical level is "1", the inner rim side of the pit is longer in the track direction than its outer rim side, as shown in FIG. 10A, whereas, if the logical level is "0", the outer rim side of the pit is longer in the track direction than its inner rim side, as shown in FIG. 10B.

In the recording device for recording the second data D2L along with the first data D2U on the optical disc, two laser beams L are radiated in the recording device shown in FIG. 1, these twp laser beams L are on/off controlled by respective light modulators, and the two laser beams outputted by the light modulator are incident on the master disc 2 and converged on an objective lens 9 so that the inner rim portion and the outer rim portion in the track direction of the pit $P_1$ will be exposed to light.

The recording device, adapted for recording not only the first data D2U but also the second data D2L on the optical disc, according to the present embodiment, appends an error correction code to the second data D2L and interleaves the resulting data to generate a serial data string. The recording device also on-off controls the two light modulators by the channel data D3 generated from the first data D2U of the upper 16 bits and by the serial data string.

The disc reproducing apparatus, adapted for reproducing the optical disc, on which are recorded not only the first data D2U but also the second data D2L, by the recording device, illuminates a light beam on the optical disc and receives the return light beam reflected from the optical disc by a pre-set photodetector provided on the optical pickup.

Figure 11:
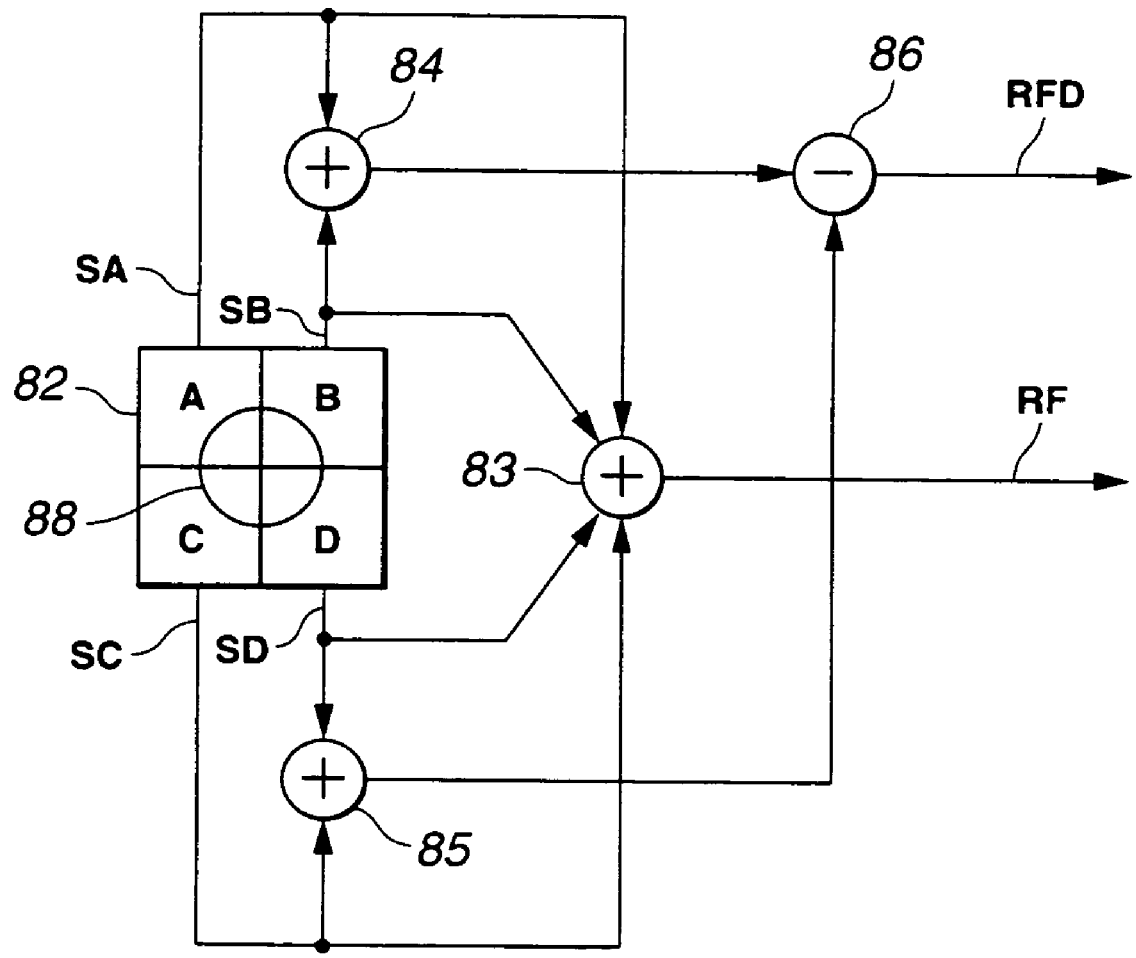
FIG. 11 is a block diagram showing a photodetector constituting an optical pickup used in a disc reproducing apparatus according to the present invention.

Referring to FIG. 11, the photodetector 82 is split in the track direction, corresponding to the track extending direction on the optical disc, and in a direction perpendicular to the track direction, to define first to fourth photodetector portions A to D. The return light beam reflected from the optical disc forms a beam spot 88 about the point of intersection of division lines of the first to fourth photodetector portions A to D as center.

The photodetector 82 outputs detection outputs SA to SD detected by the first to fourth photodetector portions A to D. The disc reproducing device, having an optical pickup including this photodetector 82 and adapted for reproducing the optical disc according to the present invention, processes the detection outputs SA to SD, as detected by the first to fourth photodetector portions A to D, with current to voltage conversion, and performs processing operations to generate reproducing signal Rf etc. This disc reproducing device sums the detection outputs SA to SD, outputted by the first to fourth photodetector portions A to D, by a first adder circuit 83, to generate reproducing signal Rf, and processes the reproducing signal Rf in the same way as the customary disc reproducing device used exclusively for reproducing the compact disc to reproduce the upper 16-bit first data D2U recorded by a string of plural pits.

The disc reproducing device according to the present invention includes, in addition to the first adder circuit, second and third adders 84, 85, as shown in FIG. 11. These second and third adders 84, 85 sum detection outputs SA and SB as detected by the first and second photodetector portions SA, SB and detection outputs SC and SD as detected by the third and fourth photodetector portions SC, SD to produce the results of addition SA+SB and SC+SD which are subjected to subtraction in a subtraction circuit 86. By this signal processing, the disc reproducing device for reproducing the optical disc according to the present invention generates a reproducing signal RFD (SA+SB−SC−SD), the signal level of which is changed responsive to the shape of the pit $P_1$ whose inner rim side shape is changed and to the shape of the pit $P_1$ whose outer rim side shape is changed, among the pits the lengths of which in the track direction on left and right sides of a track have been changed based on the second data D2L of the lower two bits. If the signal level of the reproducing signal RFD is changed to more than a pre-set extent, the reproducing signal RFD is bi-level-discriminated at a timing at which the reproducing signal RFD is produced from the site of different shapes of the pits $P_1$ on the inner and outer rim sides, and the bi-level-discriminated signal is processed to produce playback data derived from the second data D2L and which is of a higher frequency range than the frequency range of the first data D2U.

In this optical disc, the audio data DAEx synthesized from the first data D2U and the second data D2L is selectively processed to achieve audio reproduction of a high sound quality having the frequency range equivalent to 18 bits.

(11) Ninth Embodiment

In this optical disc, the first data D2U of the upper 16 bits of the 18-bit audio data is processed in the same way as the customary compact disc to form a string of plural pits $P_1$, which is recorded. The second data D2L is recorded by changing the lengths of the plural pits $P_1$ and lands $R_1$ recorded on the optical disc in the direction of left and right tracks about the track center $T_0$ as center from the normal lengths based on the second data D2L. The lands $R_1$ are defined between the pits $P_1$ recorded on the optical disc. In this case, the lengths of the inner and outer rims of the pits $P_1$ and lands $R_1$ in the track direction of the optical disc are changed in a specified channel bit. In the present example, this specified channel bit is set at a center bit $B_{c1}$ of the connecting bits $B_c$ to change the shape of the pit $P_1$ and that of the land $R_1$ by the connecting bits on the inner and outer rim sides on the left and right sides of the track center T0. The 14 channel bits, between the connecting bits $B_c$, to which are allotted the first data D2U of the upper 16 bits, are not affected by the recording of the lower 2 bits of the second data D2L, and may be reproduced with phase allowance and amplitude allowance comparable to those in the customary compact disc.

For recording the first data D2U and the second data D2L on the optical disc, the recording device 1 on/off controls the three laser beams, obtained on separating the laser beam L outputted by the recording laser 5, shown in FIG. 1, by respective light modulators 6, and converges the three laser beams, outputted by the light modulator 6, on the master disc 2 by the objective lens 9. These three light beams are allotted to the center of each pit, with the track center $T_0$ as center, and to the inner and outer sides of the optical disc, which are on the left and right sides of the track center $T_0$.

The recording device 1 also on/off controls the laser beam allotted to the center of the pit $P_1$, by the channel data D3 generated by the upper 16-bit first data D2U, to record the upper 16-bit first data D2U by repetition of strings of plural pits $P_1$.

Figure 2:
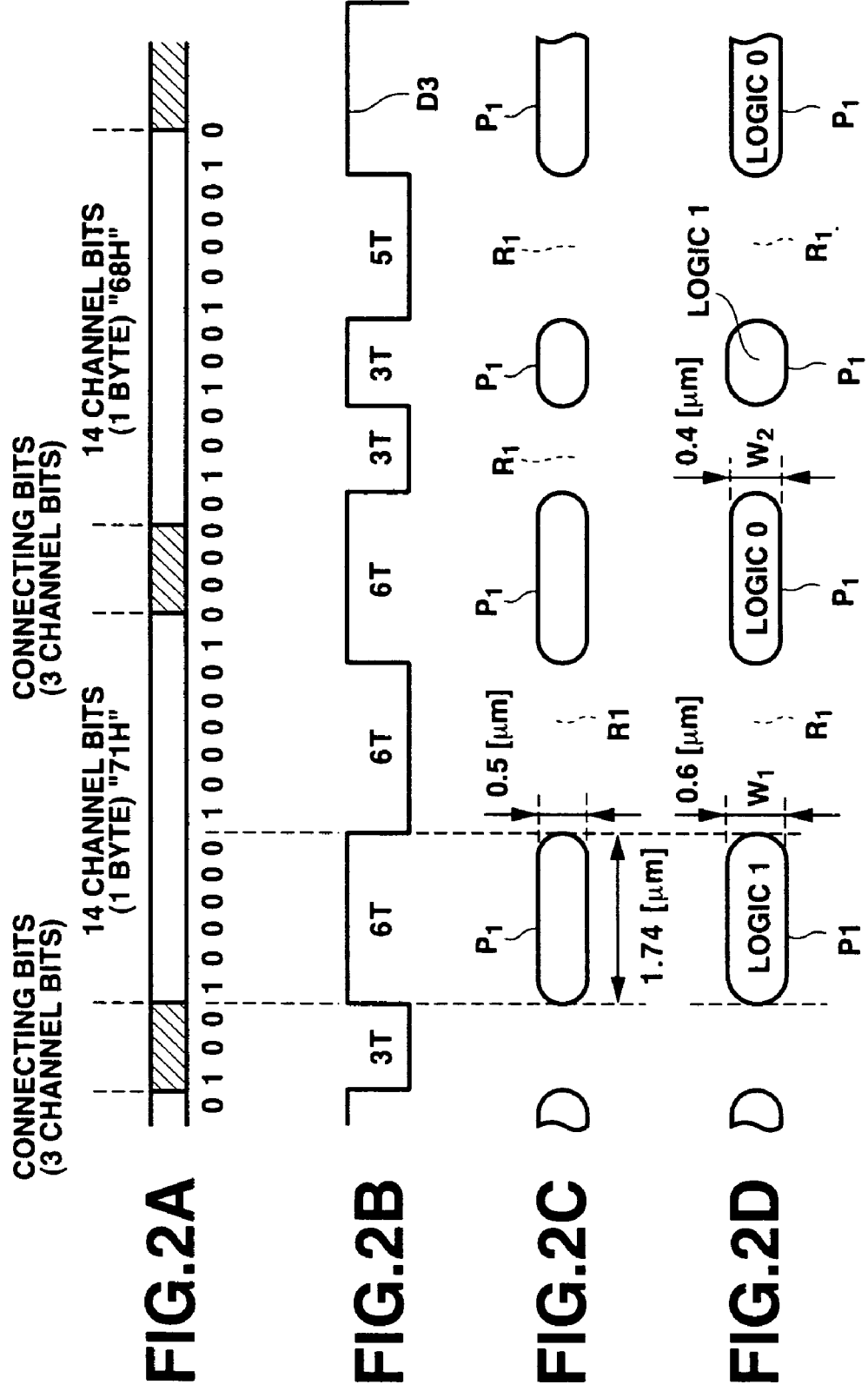
FIGS. 2A to 2D are diagrammatic views showing the structure of a track in which are formed pits formed in an optical disc prepared by the recording apparatus according to the present invention.

The recording device 1 also appends an error correction code to the second data D2L and interleaves the resulting data to form a serial data string, and outputs the laser beam allotted to the inner or outer rim sides of the pit $P_1$, responsive to the logical level of the serial data string, at a timing of the center bit $B_{c1}$ of the connecting bits Bc in the channel data D3, whereby, if the pit $P_1$ associated with the first data D2U is formed astride the connecting bits $B_c$, as shown in FIG. 12A, the master disc 2 is exposed to light in such a manner that, responsive to the logical level of the first data D2U, the width $W_{21}$ of the pot $P_1$ will be changed appreciably towards the inner and outer rim sides, at a portion corresponding to the center bit $B_{c1}$ of the connecting bits $B_c$, as shown in FIGS. 12B-1 and 12B-2.

In a case wherein the pit $P_1$ continues to the center $B_{c1}$ of the connecting bits $B_c$, the master disc 2 is exposed to light so that the width $W_{21}$ of the pit $P_1$ will be increased towards the inner or outer rim at the trailing end in the track direction of the pit $P_1$ associated with the center bit $B_{c1}$ of the connecting bits $B_c$, depending on the logical level of the second data D2L, as shown in FIGS. 12C-1 and 12C-2. In a case wherein the pit $P_1$ is started as from the center $B_{c1}$ of the connecting bits $B_c$, the master disc 2 is exposed to light so that the width $W_{21}$ of the pit $P_1$ will be increased towards the inner or outer rim at the leading end in the track direction of the pit $P_1$ associated with the center bit $B_{c1}$ of the connecting bits $B_c$, depending on the logical level of the second data D2L, as shown in FIGS. 12D-1 and 12D-2.

In a case wherein the center bit $B_{c1}$ of the connecting bits $B_c$ is allotted to the land R, the master disc 2 is exposed to light so that, responsive to the logical level of the second data D2L, a pit $P_{c1}$ having width corresponding to the increased width $W_{21}$ of the pit $P_1$ will be formed, as shown in FIGS. 12E1 and 12E-2.

The disc reproducing apparatus, adapted for reproducing the optical disc, having the first data D2U and the second data D2L recorded thereon as described above, performs selective bi-level discrimination of the reproducing signal RFD, obtained using the photodetector 82 shown in FIG. 11, at a timing the light beam radiated from the optical pickup scans the center bit $B_{c1}$ of the connecting bits $B_c$, to generate playback data of a frequency range higher than that of the first data D2U derived from the lower 2-bit second data D2L.

With the present optical disc, it is similarly possible to achieve audio reproduction with the high sound quality (ExCD sound quality) of a broad frequency range equivalent to 18 bits by selective processing of the audio data DAEx synthesized from the first data D2U and the second data D2L.

Moreover, by setting a specified channel bits at the connecting bits $B_c$ and by setting it at the center bit $B_{c1}$ of the connecting bits $B_c$, the 14 channel bits, between the connecting bits $B_c$, to which are allotted the upper 16 bit first data D2U of the 18-bit audio data, are not affected by the recording of the lower 2 bits of the second data D2L, and may be reproduced with phase allowance and amplitude allowance comparable to those in the customary compact disc.

(12) Tenth Embodiment

Figure 13A:
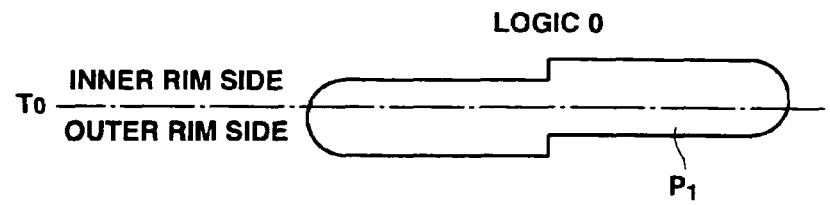
FIGS. 13A and 13B are plan views showing the structure of pits formed in an optical disc according to a tenth embodiment of the present invention.

With the optical disc of the present embodiment, as with the optical disc s of the above-described respective embodiments, the upper 16-bit first data D2U of the 18-bit audio data are processed as in the customary compact disc so as to be recorded as plural bits. On the other hand, the lower 2-bit second data D2L are recorded by the forward and rear portions in the lengthwise direction thereof in the track direction of the pit $P_1$ are offset in a direction perpendicular to the track direction with the track center $T_0$ in-between. If, in the present embodiment of the optical disc, the logical level of the second data D2L is the logical "0", the forward side of the pit $P_1$ is offset towards the outer rim of the optical disc in a direction perpendicular to the track direction from the track center $T_0$, with the center of the pit in the lengthwise direction thereof in the track direction as a boundary, whilst the rear end of the pit $P_1$ is offset towards the inner rim of the optical disc from the track center $T_0$ in a direction perpendicular to the track direction, as shown in FIG. 13A. On the other hand, if the logical level of the second data D2L is the logical "1", the forward side of the pit $P_1$ about the center in the lengthwise direction thereof in the track direction as a boundary is offset towards the inner rim of the optical disc in the direction perpendicular to the track direction from the track center $T_0$, whilst its rear portion is offset towards the outer rim of the optical disc in a direction perpendicular to the track direction towards the track center $T_0$.

For preparing an optical disc in which the forward and rear portions of the pit $P_1$ formed based on the first data D2U in the lengthwise direction thereof in the track direction are offset in the direction perpendicular to the track direction with the track center $T_0$ in-between the radiating direction of the laser beam L is deflected by a light deflector 6 arranged on the optical path of the laser beam L outputted by the light modulator 6 of the recording device 1 shown in FIG. 1 at a timing at which the pit $P_1$ is offset by the lower 2-bit second data D2L. The light modulator may be an electro-acoustic optical element.

Figure 13B:
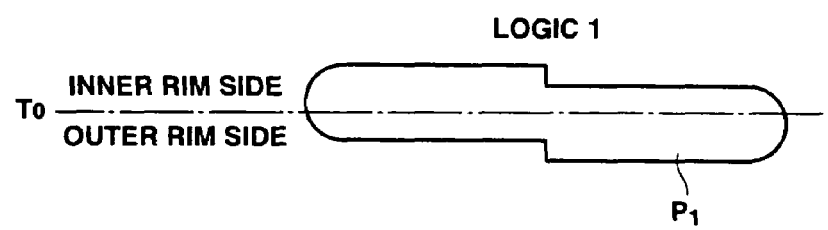

At this time, the second data D2L is phase-modulated to drive the light modulator 6 to split one of the bits of the second data D2L into two channels, the logical levels of which are set in meeting with the offsetting of the pit $P_1$, as shown in FIGS. 13A and 13B.

The amount of the offset of the pit $P_1$ in the direction perpendicular to the track direction is set so that the tracking control in reproduction will not be affected by the offsetting of the pit $P_1$ and so that the upper bit side first data D2U will be reproduced with sufficient phase allowance and sufficient amplitude allowance.

In reproducing the optical disc, the second data D2L recording by the offsetting of the pit $P_1$ is reproduced using the output signal RFD obtained from the photodetector 82 provided on the optical pickup of the disc reproducing apparatus as shown in FIG. 11, or using the high range signals of the tracking error signals.

With the optical disc of the present embodiment, even in a case wherein the pit $P_1$ formed based on the first data D2U is offset in the direction perpendicular to the track direction so that the width of the pit differs in the forward and rear portions in the lengthwise direction thereof in the track direction with the track center $T_0$ in-between, by the lower 2-bit second data D2L, it is possible to synthesize the first data D2U and the second data D2L to achieve audio reproduction of high sound quality (ExCD sound quality) of the broad frequency range equivalent to 18 bit sound quality.

(13) Eleventh Embodiment

If, in the optical disc of the present invention, the length in the track direction of the pit $P_1$ is varied from its normal length to record the second data D2L, two edges of the pit $P_1$ are necessarily present in a codeword made up of 14 channel bits, to which is allotted 1 byte (8-bit) audio data, under the modulation rule of the EFM modulation, as shown in FIG. 5. This modulation rule of the EFM modulation is based on the format of the customary compact disc. In such case, the 2-bit second data D2L may be allotted to each codeword.

Meanwhile, if the 1-bit second data D2L is allotted to the sole pit $P_1$ by the width of the pit $P_1$ as the length in the direction perpendicular to the track direction, or by the depth of the pit $P_1$, two pits $P_1$ are not necessarily allotted to a sole codeword, depending on the EFM modulation rule. In such case, it is difficult to allot the second data D2L of 2 bits to each codeword.

In such case, the second data D2L is allotted to the pits $P_1$ so that the upper bit first data D2U and the lower bit second data D2L are associated with each other, with a pre-set block as a unit.

Specifically, with the format of the customary compact disc, connecting channel bits and code words are arrayed in succession to the 22 channel clock frame sync so that each frame is formed by 588 channel clocks. A CD frame is formed by a concatenation of these frames. Thus, in a frame comprising 588 channel clocks, or in a CD frame, the second data D2L is sequentially allotted to the respective pits, so that the upper bit first data D2U and the lower bit second data D2L will be in meeting with each other.

In the recording device for preparing the optical disc, the second data D2L is buffered in an amount corresponding to at least 588 channel clocks or to a CD frame, and is sequentially outputted at a pit-forming timing to vary the normal pit length in the track direction. Also, with the disc reproducing apparatus, the reproduced second data D2L is buffered, with the sync frame or sub-code as a reference, and is outputted at a timing of the associated upper bit first data D2U, for processing.

With the present optical disc, in which the upper bit first data D2U is split on the block basis for recording, and the lower bit second data D2L is allotted to the pits of the associated block, on the block basis, the lower bit second data D2L is recorded even if the two pits are not necessarily allotted to each codeword under the modulation rule, whereby it is possible to synthesize the first data D2U and the second data D2L to achieve audio reproduction of high sound quality equivalent to 18-bit sound quality.

(14) Twelfth Embodiment

Figure 14A:
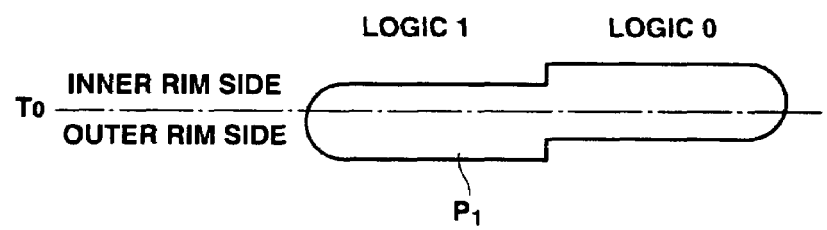
FIGS. 14A and 14B are plan views showing the structure of pits formed in an optical disc according to an eleventh embodiment of the present invention.
Figure 14B:
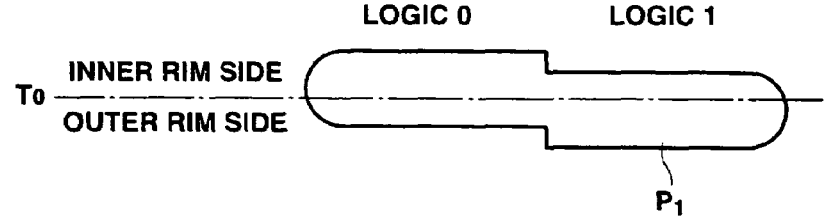

In the optical disc of the present embodiment, a sole codeword by 14 channel bits is split at a pre-set bit cell boundary, and the second data D2L is recorded as the forward and rear portions in the lengthwise direction of the pit in the track direction are offset in the direction perpendicular to the track direction, with the track center $T_0$ in-between, as shown in FIGS. 14A and 14B.

For recording the lower bit second data D2L, the pit $P_1$ is split into a forward portion and a rear portion in the track direction with the center bit cell in the lengthwise direction thereof in the track direction and each one bit of the second data D2L is allotted to the split region, whilst the 2-bit second data D2L is allocated to each code word.

If, in this optical disc two bits $P_1$ re allotted to e.g., a code word so that the associated second data D2L will be allotted to each code word, it is necessary that one of the pit $P_1$ ceases to be deformed.

With the present optical disc, in which a code word is split at a pre-set bit cell boundary, and the forward and rear portions of the lengthwise direction of each pit $P_1$ in the track direction, with the bit cell boundary as a boundary, are offset in a direction perpendicular to the track direction on both sides of the track center $T_0$, plural bits of the lower bit second data D2L can be allotted to a sole pit for correspondingly improving the recording density of the second data D2L.

Moreover, each codeword may be associated with the second data D2L for correspondingly simplifying the processing of the recording and reproducing system.

(15) Other Embodiments

In the foregoing description, the lower bit second data D2L are recorded by changing the width, depth, length in the track direction or length in the direction perpendicular to the track direction, of the pit, differentially deforming the inner and outer rims in the track direction of the pit, or differentially offsetting the forward and rear portions in the track direction of the pit in the direction of the inner and outer rims of the disc. The present invention is, however, not limited to these embodiments since these embodiments may be used in combination. By so doing, the data volume that can be allotted to each bit may be increased, while the error correction code appended to the second data D2L can be intensified and the recording and/or reproduction of these sorts of data can be improved in reliability. Moreover, the audio data improved in the number of bits or data volume can be recorded. In this case, the second data D2L associated with a code word can be allotted to plural bits to simplify the processing of the recording and reproducing systems.

Figure 15A:
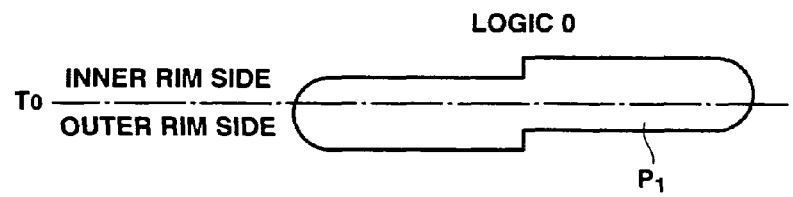
FIG. 15 is a plan view showing the structure of pits formed in an optical disc according to a further embodiment of the present invention.
Figure 15B:
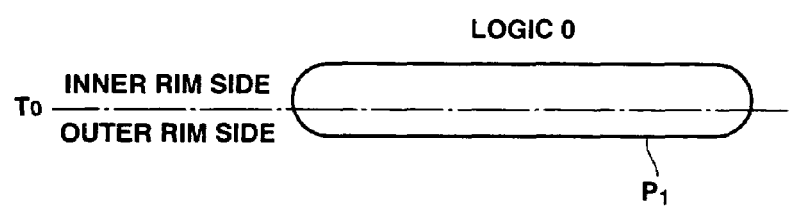

In the foregoing description, the lower bit second data D2L are recorded by changing the width, depth, length in the track direction or length in the direction perpendicular to the track direction, of the pit, differentially deforming the inner and outer rims in the track direction of the pit, or differentially offsetting the forward and rear portions in the track direction of the pit in the direction of the inner and outer rims of the disc. The present invention is, however, not limited to this configuration and may be applied to the recording by multiple values. That is, in comparison with FIGS. 13A and 13B, it will be seen that, if a pit $P_1$ having the forward side and the rear side with the lengthwise mid portion thereof in the track direction as a boundary offset towards the outer and inner rims of the disc, respectively, from the track center $T_0$ in a direction perpendicular to the track direction, a pit $P_0$ not offset as shown in FIG. 15B and a pit $P_1$ having the forward side and the rear side with the lengthwise mod portion thereof in the track direction as a boundary offset towards the inner and outer rims of the disc, respectively, from the track center $T_0$ in the direction perpendicular to the track direction, are combined together to enable plural bits of the lower bit second data D2L to be recorded with three values. Even with such multi-valued recording, plural bits of the second data D2L can be allotted to a codeword to simplify the processing of the recording and reproducing systems correspondingly.

In the foregoing description, an error correction code is allotted to the lower 2-bit second data D2L, in association with the processing of the upper 16-bit first data D2U, and the resulting data is interleaved. The present invention is, however, not limited to this configuration since the second data D2L can be processed and recorded by processing different from that described above.

In the foregoing description, when the lower bit second data D2L are recorded by changing the width, depth, length in the track direction or length in the direction perpendicular to the track direction, of the pit, differentially deforming the inner and outer rims in the track direction of the pit, or differentially offsetting the forward and rear portions in the track direction of the pit in the direction of the inner and outer rims of the disc, the second data D2L is modulated in phase. However, phase modulation may also be used when the second data D2L is recorded based on the different between the inner and outer rims of the pit.

In the foregoing description, the inner and outer rims of the pit are offset at the center bit of the connecting bits, as a specified channel bit. However, the present invention is not limited thereto since the leading or trailing bit of the connecting bits, or one of the 14 channel bits, to which the first data D2U are allotted, may be used as the specified channel bit. In this case, plural bits of the second data D2L may be allotted to a single connecting bit or a single bit of the 14 channel bits, as appropriate.

In the foregoing description, the inner and outer rims of the pit are offset at the center bit of the connecting bits, as a specified channel bit. However, the present invention is not limited thereto since the second data D2L may be recorded by varying the pit width or depth at a specified channel bit. In such case, the second data D2L may be allotted to a sole connecting bit or to plural bits of a sole 14-channel bits.

In the foregoing description, the lower 2-bit second data D2L of the 18-bit audio data is deformed, along with the error correction code, with the pits derived from the first data D2U of the upper 16 bits. The present invention is, however, not limited to this configuration since all or part of the error correction code may be allotted to the sub-code.

Also, in the foregoing description, 18-bit audio data are recorded as it is split into upper 16 bits and lower 2 bits. However, the present invention is not limited to this embodiment since it may be broadly applied to a case of splitting the audio data of a variable number of bits to upper and lower order bits.

Moreover, in the foregoing description, desired audio data are recorded by pits and lands. The present invention is, however, not limited to this configuration since the present invention may be broadly applied to a magneto-optical disc or a magneto-optical disc recording and/or reproducing apparatus for recording audio data by repetition of marks and spaces.

The present invention also is not limited to recording the audio data on an optical disc since the present invention may be broadly applied to recording video data on an optical disc.

(16) Further Embodiments

Figure 15C:
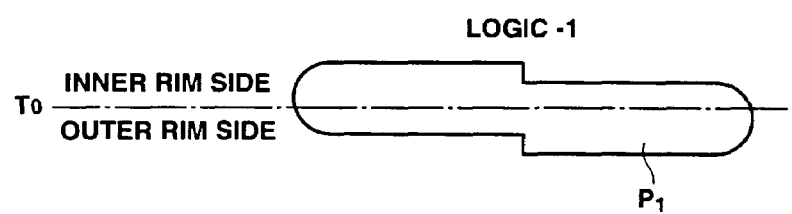
Figure 16:
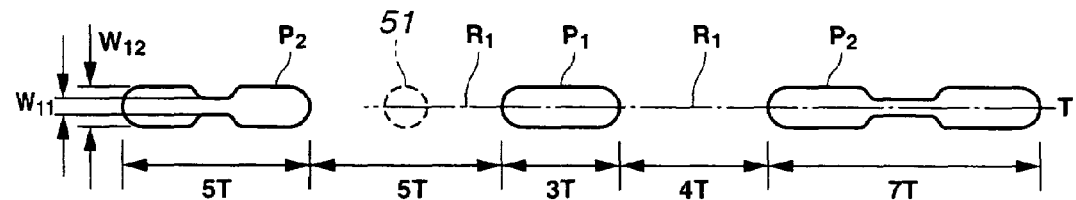
FIG. 16 is a plan view showing how a mid portion in the longitudinal direction of a pit formed in an optical disc according to the present invention has been deformed into second data.

In the above-described embodiments, the second data D2L is recorded by varying the length of pits of a track, constituted by the plural pits $P_1$ corresponding to the first data D2U, and the lands $R_1$ defined between these pits, along the entire length thereof in the track direction, by varying the width of the pits as a length in a direction perpendicular to the track direction, and by varying the width of the pits as from a mid portion towards the forward or rear end of the pit. Alternatively, the second data D2L may be recorded by setting the length of the pit $P_2$ at a mid portion thereof in the track direction T thereof, that is a width $W_{11}$, to a width $W_{11}$ narrower than the length thereof in the track direction T, that is the normal width $W_{12}$, as shown in FIG. 16. Still alternatively, the second data D2L may be recorded by forming a recess 51 shallower in depth than the normal pit $P_1$, as shown in FIG. 15.

The pit $P_2$ of the second data D2L, recorded by varying the width $W_{11}$ at a mid portion thereof in the track direction T in the direction perpendicular to the track direction T, is of a period not less than 5T, whereas the land $R_1$ of the second data D2L, recorded by forming the recess 51 shallower in depth than the normal pit $P_1$, may also be of a period not less than 5T.

By recorded the second data D2L by the pit $P_2$ with a period not less than 5T, it is possible to read out the second data D2L with a sufficient detection output as the detection output of the first data D2U recorded by the pit $P_2$ is prevented from being decreased.

The reproduction, that is reading, of the second data D2L, is hereinafter explained.

Figure 17:
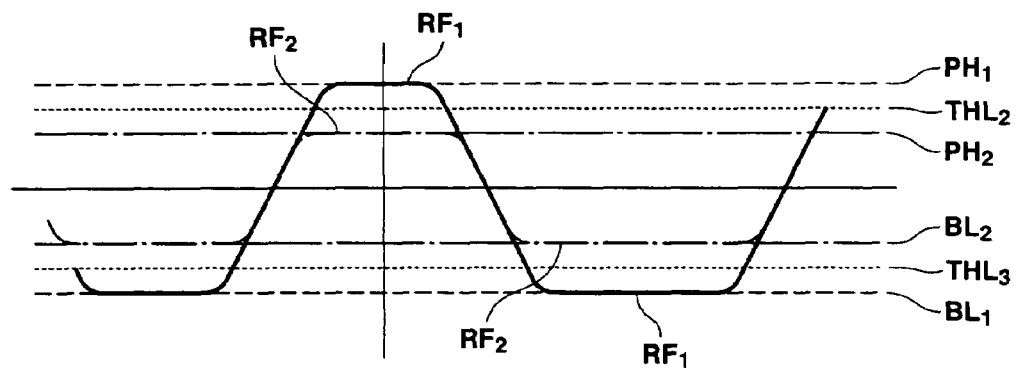
FIG. 17 shows a playback output obtained on reproducing the optical disc shown in FIG. 16.
Figure 18:
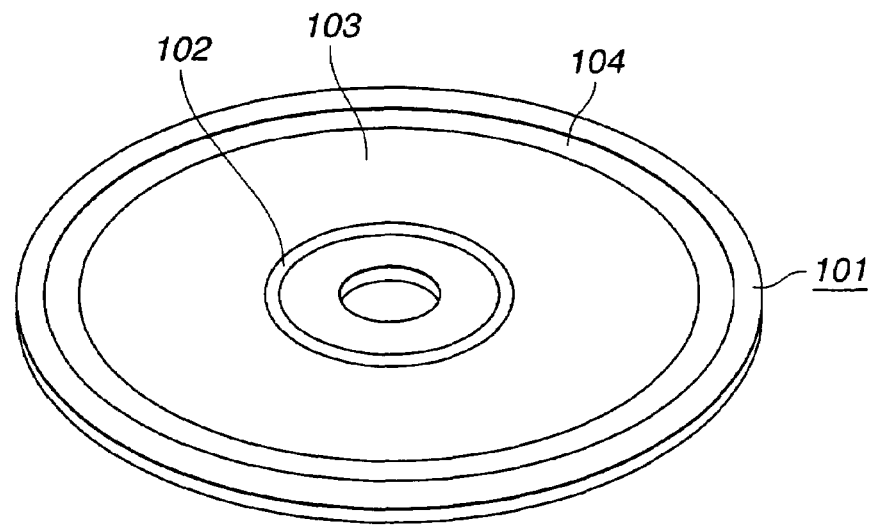
FIG. 18 is a perspective view showing an optical disc according to the present invention.

The reproducing signal outputted from the RF circuit 24 of FIG. 1, corresponding to the pit P1 having the normal width $W_{12}$ and the land $R_1$ not provided with the recess 51, is the reproducing signal Rf1, having the regular amplitude, as shown in FIG. 17, whereas the reproducing signal corresponding to the pit $P_2$ having a narrow width $W_{11}$ and the land $R_1$ having the recess 51, is the reproducing signal Rf2 smaller in amplitude than the reproducing signal Rf1.

In the present embodiment, in which the lengths of the pit $P_2$ and the land $R_1$, carrying the second data D2L, are of a period not less than 5T, it is unnecessary to normalize the reproducing signal Rf in the RF level discriminating circuit 28 of FIG. 1, so that the reproducing signal Rf from the RF circuit 24 is directly supplied to the bi-level demodulation circuit 30. The bi-level demodulation circuit 30 has two threshold values, for example, a threshold value $TH_2$ as an intermediate level between the reproducing signals Rf1, Rf2 corresponding to the land $R_1$ having the recess 51 and to the land $R_1$ not having the recess 51, and a threshold value $TH_3$ at an intermediate level between the reproducing signals Rf1, Rf2 corresponding to the pits $P_1$, $P_2$, respectively. The bi-level demodulation circuit 30 discriminates the reproducing signal Rf outputted by the RF circuit 24, based on the threshold value $TH_2$, to reproduce the second data D2L. The bi-level demodulation circuit 30 also discriminates the reproducing signal Rf, based on the threshold value $TH_3$, to reproduce the second data D2L recorded on the pit $P_2$.

(17) Further Embodiments

In the above-described embodiments, the second data D2L is recorded as audio data of the high frequency range as supplementary data to the first data D2U not contained in the upper 16-bit first data D2U of audio data DA as 18-bit parallel digital data. However, data concerning the first data D2U is used as the second data D2L.

For example, if the first data D2U is the 2-channel audio data, the second data D2L may be the audio data constituting multi-channel audio data as a portion of the first data D2U. The second data D2L used here is data inputted to a speaker arranged at the front side center of the multi-channel data or a speaker arranged above the listener's head or data inputted to left and right speakers on the back side.

The second data D2L may be data recorded as multi-channel audio data independent from the first data D2U.

If the first data D2U is the audio data of a musical number including the lyrics, the second data D2L is recorded as data corresponding to the performing portion of this musical number. By recording the first data D2U and the second data D2L, it is possible to selectively reproduce only the performing portion of a musical number including the lyric, thus realizing variegated audio reproduction.

As the second data D2L, copyright data for protecting the copyright by imposing limitations on duplication of the first data D2U recorded as digital data may be recorded.

If, when the first data D2U is encrypted, the second data D2L is recorded as key data for decrypting the first data D2U, it is possible to inhibit free reproduction or duplication of the first data D2U to assure reliable protection of the work corresponding to the first data D2U.

The second data D2L may also be management data indicating that the supplementary data relevant to the first data D2U has been recorded with signal compression.

The second data D2L may be recording with signal compression with variable formats in areas totally independent of the area in which to record the second data D2L.

In an inner rim area of an optical disc 101, having the second data D2L recorded thereon along with the first data D2U, there is provided a lead-in area 102 in which to record TOC (table-of-contents) data indicating the contents of data recorded on the optical disc 191. A first data recording area 103 is provided on an outer rim side of the lead-in area 102 and a second data recording area 104 is provided on the outer rim area of the first data recording area 103.

In the first data recording area 103, there is recorded audio data in a format of the customary compact disc, whereas, in the second data recording area 104, there is recorded audio data capable of realizing audio reproduction of optimum sound quality. This audio data includes even the audio data of high frequency range not contained in the audio data recorded in the first data recording area 103 with signal compression afforded by a variety of signal compression means.

If data recorded in the second data recording area 104 is such data as fee charging, this data is the first data D2U, while plural bits formed based on the first data D2U is deformed based on the encryption data as the second data D2L and recorded. By recording the encryption data as the second data D2L, it is possible to inhibit free reproduction or duplication of the data recorded in the second data recording area 104 to assure reliable protection of the work derived from the second data D2L.

In this case, data for decoding the encrypted data is recorded in the lead-in area 102. This data is recorded by deforming the plural pits formed based on the TOC data based on the data used for decrypting the encrypted data.

The data recorded in the second data recording area 104 need not necessarily be a unit of audio data, since a variety of data such as data constituting the multi-channel audio data may be recorded along with the data recorded in the first data recording area.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

By not recording supplementary data in the pits formed based on data recorded in the first data recording area 103, it is possible to maintain high data quality of data recorded in the data recording area 103.

The pits formed in the lead-in area 102 may be deformed by second data indicating the presence of the second data recording area 104 for recording.

INDUSTRIAL APPLICABILITY

According to the present invention, as described above, since the plural pits of a track constituted by plural pits formed based on first data to be recorded and lands between the pits are deformed based on the second data and the deformed pits are recorded, high-quality audio reproduction may be achieved. Moreover, variegated audio reproduction may be achieved by suitably synthesizing or selecting the first and second data for reproduction.

The invention claimed is:

1. A reproducing apparatus for an optical recording medium, comprising:
    an optical pickup for reading out first and second data from an optical recording medium including a track having a plurality of pits formed based on said first data recorded therein and lands defined between neighboring pits, said plurality of pits being deformed based on said second data;
    a first demodulator for demodulating said first data of said optical recording medium based on an output signal from said optical pickup; and
    a second demodulator for demodulating said second data of said optical recording medium based on said output signal from said optical pickup.

2. The reproducing apparatus for an optical recording medium according to claim 1, further comprising:
    a signal processor for generating playback signals based on said output signal from said optical pickup, wherein
    said playback signals from the signal processor are fed to said first and second demodulators.

3. The reproducing apparatus for an optical recording medium according to claim 2, wherein
    said second demodulator includes a signal level discriminating unit for discriminating a signal level of said playback signals from said signal processor and a demodulation processor for demodulating an output of said signal level discriminating unit.

4. The reproducing apparatus for an optical recording medium according to claim 1, further comprising:
    a synthesizing unit for synthesizing an output signal from said first demodulator and an output signal from said second demodulator into a synthesized signal.

5. The reproducing apparatus for an optical recording medium according to claim 1, further comprising:
    an external equipment discriminating unit for discriminating whether an external equipment connected to the reproducing apparatus belongs to the predetermined class of external equipment, wherein
    said reproducing apparatus outputs an output signal from said second modulator when said external equipment connected to the reproducing apparatus is discriminated by said external equipment discriminating unit to belong to the predetermined class of external equipment.

6. The reproducing apparatus for an optical recording medium according to claim 1, wherein said optical pickup includes
    a photodetector split in said track direction of said optical recording medium into a first photodetector portion and a second photodetector portion;
    said recording apparatus further comprising a signal processor for processing output signals from said first and second photodetector portions;
    said first demodulator being fed from said signal processor with a sum signal representing a sum of the output signals from said first and second photodetector portions; and
    said second demodulator being fed from said signal processor with a difference signal representing a difference between the output signals from said first and second photodetector portions.

7. A reproducing apparatus for an optical recording medium, comprising:
    an optical pickup for reading out first and second data and discriminating data from an optical recording medium including a track having a plurality of pits formed based on said first data recorded therein and lands defined between neighboring pits, said plurality of pits being deformed based on said second data, said optical recording medium also having said discriminating data recorded thereon;
    a first demodulator for demodulating said first data from said optical recording medium based on an output signal of said optical pickup;
    a second demodulator for demodulating said second data of said optical recording medium based on said output signal from said optical pickup; and
    a controller for controlling operation of said second demodulator based on said discriminating data read out by said optical pickup from said optical recording medium.

8. The reproducing apparatus for an optical recording medium according to claim 7 wherein
    said discriminating data recorded on said optical recording medium is data indicating whether the second data has been recorded on said optical recording medium; and
    wherein
    said controller actuates said second demodulator when said discriminating data indicates that said second data is recorded on said optical recording medium.

9. The reproducing apparatus for an optical recording medium according to claim 8, further comprising:
    a signal processor for generating playback signals based on said output signal of said optical pickup; said first and second demodulators being fed with said playback signal from said signals processor.

10. The reproducing apparatus for an optical recording medium according to claim 9 wherein
    said second demodulator includes
    a signal level discriminating unit for discriminating a signal level of said playback signals supplied from said signal processor, and a demodulation processor for demodulating an output of said signal level discriminating portion.

11. The reproducing apparatus for an optical recording medium according to claim 9 wherein
    said controller includes a switching unit connected between said signal processor and said second demodulator, and a discriminating unit for changing over an operation of said switching portion based on said discriminating data read out from said optical recording medium; said discriminating unit switching-controlling said switching portion to send said playback signals to said second demodulator when said discriminating data indicates that the second data is recorded on said optical recording medium.

12. The reproducing apparatus for an optical recording medium according to claim 11 further comprising:
    a synthesizer for synthesizing output signals of said first and second demodulators.

13. The reproducing apparatus for an optical recording medium according to claim 12 wherein
said controller includes a further switching unit changed over by said discriminating unit for selecting one of an output signal of said synthesizing unit and an output signal of said second demodulator.

14. The reproducing apparatus for an optical recording medium according to claim 7, further comprising:
an external equipment discriminating unit for discriminating whether an external equipment connected to the reproducing apparatus belongs to a predetermined class of external equipment;
said recording apparatus outputting an output signal from said second modulator when said external equipment connected to the apparatus is discriminated by said external equipment discriminating portion to belongs to a predetermined class of external equipment.

15. The reproducing apparatus for an optical recording medium according to claim 7, wherein said optical pickup includes
a photodetector split in said track direction of said optical recording medium into a first photodetector portion and a second photodetector portion;
said reproducing apparatus further comprising a signal processor for processing output signals of said first and second photodetector portions;
said first demodulator being fed from said signal processor with a sum signal representing a sum of said output signals of said first and second photodetector portions;
said second demodulator being fed from said signal processor with a difference signal representing a difference between said output signals of said first and second photodetector portions.

16. A method for reproducing an optical recording medium comprising the steps of:
reading out first and second data from an optical recording medium including a track having a plurality of pits formed based on said first data recorded therein and lands defined between neighboring pits, said pits being deformed based on said second data;
demodulating said first data of said optical recording medium based on an output signal of data read out from said optical recording medium in said step of reading; and
demodulating said second data based on said output signal of data read out from said optical recording medium.

17. The method for reproducing an optical recording medium according to claim 16 wherein
a signal level of said output signal of data read out from said recording medium is discriminated to demodulate said second data.

18. The method for reproducing an optical recording medium according to claim 16 wherein the demodulated first data and the demodulated second data are synthesized and outputted.

19. The method for reproducing an optical recording medium according to claim 16 wherein, when a connected external equipment is discriminated to belong to a predetermined class of external equipment, demodulated second data is outputted.

20. The method for reproducing an optical recording medium according to claim 16 wherein
an optical pickup including a photodetector split into a first photodetector portion and a second photodetector portion in the track direction of said optical recording medium is used;
said first data is demodulated based on a sum signal representing a sum of output signals of said first and second photodetector portions; and
said second data is demodulated based on a difference signal representing a difference between output signals of said first and second photodetector portions.

21. A reproducing method for an optical recording medium comprising the steps of:
demodulating first data based on playback signals of data read out from an optical recording medium including a track made up of a plurality of pits formed based on said first data recorded and lands defined between neighboring pits, said plural bits being deformed based on second data, said optical recording medium having discrimination data recorded thereon; and
demodulating said second data based on said playback signals of data read out from said optical recording medium based on results of of discriminating said discrimination data read out from said optical recording medium.

22. The reproducing method for an optical recording medium according to claim 21 wherein, when the discrimination data recorded on said optical recording medium indicate that said second data is recorded on said optical recording medium, said second data is demodulated based on said playback signals of data read out from the optical recording medium.

23. The reproducing method for an optical recording medium according to claim 21 wherein a signal level of said playback signals of data read out from the optical recording medium is discriminated to demodulate said second data.

24. The reproducing method for an optical recording medium according to claim 21 wherein the demodulated first data and the demodulated second data are synthesized and outputted.

25. The reproducing method for an optical recording medium according to claim 21 wherein, when a connected external equipment is discriminated to belong to a predetermined class of authentic external equipment, demodulated second data is outputted.

26. The reproducing method for an optical recording medium according to claim 21 wherein an optical pickup including a photodetector split into at least a first photodetector portion and a second photodetector portion in the track direction of said optical recording medium is used;
said first data is demodulated based on a sum signal representing a sum of output signals of said first and second photodetector portions; and wherein
said second data is demodulated based on a difference signal representing a difference between output signals of said first and second photodetector portions.

* * * * *

UNITED STATES PATENT AND TRADEMARK OFFICE
CERTIFICATE OF CORRECTION

PATENT NO. : 7,397,748 B2
APPLICATION NO. : 10/926743
DATED : July 8, 2008
INVENTOR(S) : Yoichiro Sako Page 1 of 1

It is certified that error appears in the above-identified patent and that said Letters Patent is hereby corrected as shown below:

On the Title Page, Item (62) under Related U.S. Application Data, "Dec. 7, 1998" should read --Dec. 7, 1999--.

Signed and Sealed this
Nineteenth Day of April, 2011

David J. Kappos
*Director of the United States Patent and Trademark Office*